(12) United States Patent
Brkic

(10) Patent No.: US 11,861,760 B2
(45) Date of Patent: Jan. 2, 2024

(54) TILE-BASED GRAPHICS PROCESSING

(71) Applicant: Arm Limited, Cambridge (GB)

(72) Inventor: Toni Viki Brkic, Lund (SE)

(73) Assignee: Arm Limited, Cambridge (GB)

( * ) Notice: Subject to any disclaimer, the term of this patent is extended or adjusted under 35 U.S.C. 154(b) by 145 days.

(21) Appl. No.: 17/648,763

(22) Filed: Jan. 24, 2022

(65) Prior Publication Data

US 2022/0237730 A1    Jul. 28, 2022

(30) Foreign Application Priority Data

Jan. 27, 2021 (GB) .................................. 2101072

(51) Int. Cl.
*G06T 1/20* (2006.01)
*G06T 1/60* (2006.01)
*G06T 15/00* (2011.01)

(52) U.S. Cl.
CPC .................. *G06T 1/20* (2013.01); *G06T 1/60* (2013.01); *G06T 15/005* (2013.01)

(58) Field of Classification Search
CPC ........... G06T 1/20; G06T 1/60; G06T 15/005; G06T 11/40; G06T 15/40
USPC ....................................................... 345/506
See application file for complete search history.

(56) References Cited

U.S. PATENT DOCUMENTS

| 8,325,184 B2 * | 12/2012 | Jiao ....................... G06T 15/005 345/506 |
| 10,127,626 B1 * | 11/2018 | Ostby ....................... G06T 1/60 |
| 10,726,610 B2 | 7/2020 | Heggelund et al. |
| 2016/0132987 A1 * | 5/2016 | Li ............................. G09G 5/18 345/522 |
| 2016/0148424 A1 * | 5/2016 | Chung .................... G06T 11/40 345/506 |
| 2019/0073176 A1 * | 3/2019 | Holland .................... G06F 3/14 |

FOREIGN PATENT DOCUMENTS

GB    2511177 A    8/2014

OTHER PUBLICATIONS

Combined Search and Examination Report dated Oct. 25, 2021, GB Patent Application No. GB2101072.3.

* cited by examiner

*Primary Examiner* — Jacinta M Crawford
(74) *Attorney, Agent, or Firm* — Vierra Magen Marcus LLP

(57) ABSTRACT

A method of operating a tile-based graphics processor that executes a graphics processing pipeline is disclosed. When there are no more primitives left to be provided for processing to the pipeline for a rendering tile, it is determined whether any remaining processing steps for the rendering tile can be omitted, e.g. because they will not affect a buffer that will be output when the rendering tile is complete. When it is determined that a processing step can be omitted, that processing step is omitted.

19 Claims, 7 Drawing Sheets

TILE-BASED GRAPHICS PROCESSING

CROSS-REFERENCE TO RELATED APPLICATIONS

This application claims priority pursuant to 35 U.S.C. 119(a) to United Kingdom Patent Application No. 2101072.3, filed Jan. 27, 2021, which application is incorporated herein by reference in its entirety.

FIELD OF THE INVENTION

The technology described herein relates to computer graphics processing, and in particular to tile-based graphics processing.

BACKGROUND

Graphics processing is normally carried out by first splitting the desired render output, e.g. the frame to be displayed, into a number of similar basic components or "primitives", which primitives are then subjected to the desired graphics processing operations. The graphics primitives are usually in the form of simple polygons, such as triangles or quadrilaterals, or points or lines.

Each primitive is usually defined by and represented as a set of vertices. Each vertex for a primitive has associated with it a set of data (such as position, colour, texture and other attributes data) representing the vertex. This data is then used, e.g., when rasterising and rendering the primitive(s) to which the vertex relates, e.g. for display.

Once primitives and their vertices have been generated and defined, they can be processed by the graphics processing system, in order, e.g., to render the frame. This process basically involves determining which sampling positions of an array of sampling positions covering the output area to be processed are covered by a primitive, and then determining the appearance that each sampling point should have (e.g. in terms of its colour, etc.) to represent the primitive at that sampling position. These processes are commonly referred to as rasterising and rendering, respectively.

The rasterising process typically determines the sampling points that should be used for a primitive (i.e. the (x, y) sampling positions for sampling points to be used to represent the primitive in the render output, e.g. frame to be displayed).

The rendering process then derives the data, such as red, green and blue (RGB) colour values and an "Alpha" (transparency) value, necessary to represent the primitive at the sampling positions (i.e. "shades" each sampling point). This can involve applying textures, blending sampling point data values, etc.

In 3D graphics literature, the term "rasterisation" is sometimes used to mean both primitive conversion to sampling points and rendering. However, herein "rasterisation" will be used to refer to converting primitive data to sampling point addresses only.

The rasterisation process basically maps the primitives defining the render output to be generated to the sampling points that will be used to render the output. This is typically done by determining, for each sampling point, whether the sampling point position is covered by the primitive in question or not. This determination is typically done by testing the sampling points' positions against the edges of the primitive, to see if the sampling points are covered by the primitive. To do this, graphics processing systems typically derive (line) equations representing each of the edges of a primitive (e.g. using the defined vertices of the primitive), and then test the sampling points' positions using these edge equations. If a sampling point "passes" the edge test, it is taken to be within the primitive.

The rasterisation process is typically carried out by testing sets of one or more sampling points. For each set of one or more sampling points found to include a sampling point that is covered by the primitive in question (being tested), a discrete graphical entity usually referred to as a graphics "fragment", on which the subsequent graphics processing operations (such as rendering) are to be carried out, is then generated by the rasteriser and sent to the rest of the graphics processing pipeline (such as the renderer) for processing.

One form of graphics processing is a so-called tile-based graphics processing, wherein the two-dimensional render output is rendered as a plurality of smaller area sub-regions, usually referred to as "tiles". The tiles are each rendered separately (e.g., one after another). The rendered tiles are then combined to provide the complete render output (e.g. frame for display).

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

In a tile-based graphics processing pipeline, the geometry (primitives) for the render output being generated is sorted into respective regions of the render output. This primitive listing process identifies primitives that need to be processed for a given region of the render output (and thus rendering tile(s)) (so as to, e.g., avoid unnecessarily rendering primitives that are not actually present in a tile). The primitive listing process produces lists of primitives to be rendered for the render output regions. Then, once the primitive lists have been prepared for the render output regions, each rendering tile is processed, by rasterising and rendering the primitives listed for the region(s) that encompass the rendering tile. The regions of the render output that primitive lists can be prepared for can correspond e.g. to single rendering tiles, or to sets of plural rendering tiles.

One drawback of current graphics processing systems is that because primitives are processed sequentially, and typically not in perfect front-to-back order, a given sampling position (and hence pixel(s)) may be shaded multiple-times as an output is processed, e.g. for display. This occurs when a first received and rendered primitive is later covered by a subsequently received and rendered primitive, such that the rendered first primitive is not in fact seen at the sampling position(s) (and pixel(s)) in question. Primitives can be overwritten many times in this manner and this typically leads to multiple, ultimately redundant, graphics processing (rendering) operations being carried out for each render output, e.g. frame, being rendered. This phenomenon is commonly referred to as "overdraw".

A number of techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.).

For example, forms of hidden surface removal may be carried out before a primitive and/or fragment is sent for rendering, to see if the primitive or fragment etc. will be obscured by a primitive that has already been rendered (in which case the new primitive and/or fragment need not be rendered). Such hidden surface removal may comprise, for example, early occlusion culling, such as early depth (Z) and/or stencil (S) testing processes. These arrangements try to identify, e.g., sampling points for a new primitive that will be occluded by already processed primitives (and therefore that do not need processing) before the sampling points are issued to the rendering pipeline. In these arrangements, the depth value, e.g., of a new primitive to be rasterised at the sampling position(s) in question is compared to the current depth values for the sampling position(s) in a depth buffer to see if the new primitive is occluded at the sampling position(s) in question or not. This can help to avoid sending fragments that are occluded by already processed primitives through the rendering pipeline.

The Applicants believe there remains scope for improvements to tile-based graphics processors.

BRIEF DESCRPITION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

Figure 1:
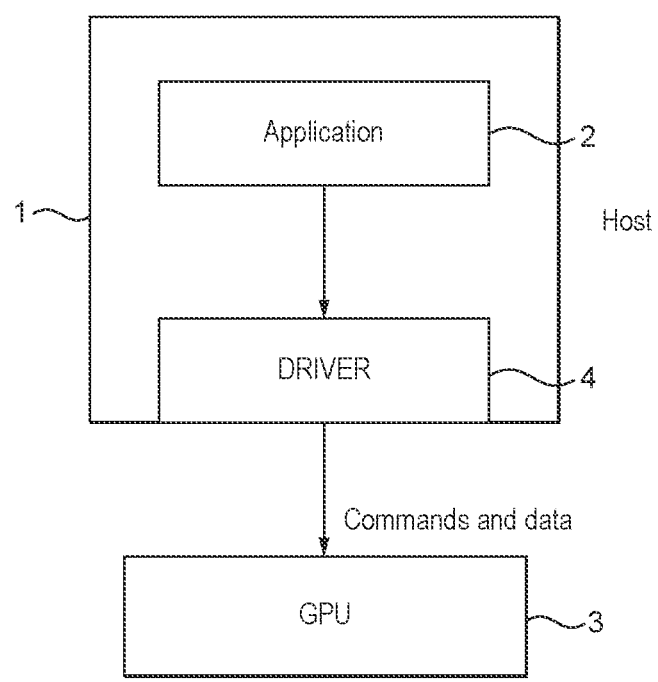
FIG. 1 shows schematically a graphics processing system that can be operated in accordance with embodiments of the technology described herein.

A first embodiment of the technology described herein comprises a method of operating a tile-based graphics processor that is operable to execute a graphics processing pipeline, the graphics processing pipeline including at least a primitive providing stage and one or more subsequent processing stages, wherein the primitive providing stage is operable to provide primitives to be processed for a rendering tile to the one or more subsequent processing stages for processing, and the one or more subsequent processing stages are operable to perform one or more processing steps in respect of primitives provided for processing by the primitive providing stage; the method comprising:

the primitive providing stage providing primitives to be processed for a rendering tile to the one or more subsequent processing stages of the graphics processing pipeline for processing; and when there are no more primitives left for the primitive providing stage to provide for processing to the one or more subsequent processing stages of the graphics processing pipeline for the rendering tile, determining whether one or more processing steps to be performed by one or more of the one or more subsequent processing stages of the graphics processing pipeline in respect of a primitive provided for processing by the primitive providing stage for the rendering tile need not be performed; and when it is determined that one or more processing steps to be performed by one or more of the one or more subsequent processing stages of the graphics processing pipeline in respect of a primitive provided for processing by the primitive providing stage for the rendering tile need not be performed, causing the one or more of the one or more subsequent processing stages of the graphics processing pipeline to omit performing the one or more processing steps in respect of the primitive.

A second embodiment of the technology described herein comprises a tile-based graphics processor that is operable to execute a graphics processing pipeline, the graphics processing pipeline including one or more processing stages that are operable to perform one or more processing steps in respect of primitives provided for processing; the tile-based graphics processor comprising:

a primitive providing circuit configured to provide primitives to be processed for a rendering tile to the one or more processing stages of the graphics processing pipeline for processing; and a determining circuit configured to, when there are no more primitives left for the primitive providing circuit to provide for processing to the one or more processing stages of the graphics processing pipeline for a rendering tile, determine whether one or more processing steps to be performed by one or more of the one or more processing stages of the graphics processing pipeline in respect of a primitive provided for processing by the primitive providing circuit for the rendering tile need not be performed; and to:

when it is determined that one or more processing steps to be performed by one or more of the one or more processing stages of the graphics processing pipeline in respect of a primitive provided for processing by the primitive providing circuit for the rendering tile need not be performed, cause the one or more of the one or more processing stages of the graphics processing pipeline to omit performing the one or more processing steps in respect of the primitive.

The technology described herein is concerned with arrangements in which it is determined whether a graphics processing pipeline need not perform one or more processing steps (e.g. processing operations) in respect of a primitive (or primitives) that has already begun it's processing in the graphics processing pipeline, such that a processing step or steps which the graphics processing pipeline would otherwise perform can be omitted (i.e. not performed) in respect of such a primitive.

In the technology described herein, it is determined whether a processing step (operation) to be performed by the graphics processing pipeline need not be performed when there are (and in an embodiment in response to there being) no more primitives left to be provided for processing (e.g. rasterising and rendering) to the pipeline for a rendering tile.

As will be discussed in more detail below, the Applicants have recognised that when the "end" of a rendering tile is reached (i.e. when there are no more primitives left to be provided for processing (e.g. rasterising and rendering) to the pipeline for that rendering tile), it may often be the case that there are primitives (fragments) already and still in the pipeline that can be discarded or "killed", without affecting the desired output for that rendering tile. This may be the case, for example, due to such primitives (fragments) only affecting buffers that will not be output by the pipeline when the rendering tile is completed.

For example, it may typically be the case that only colour buffer data is required to be output from a tile-based graphics processing pipeline once it has completed a rendering tile, whereas other data generated by the pipeline while generating the rendering tile, such as depth and stencil buffer data, will not be required to be output. As such, fragments that will update the depth and/or stencil buffer data, but not the output colour buffer, may be discardable (and in an embodiment are discarded) upon reaching the end of a rendering tile.

Thus, in the technology described herein, reaching the end of a rendering tile is used to affect and control processing remaining to be performed in respect of primitives for that rendering tile that are already in the pipeline (and whose processing is still to be completed).

This can help to reduce the processing effort required to generate a rendering tile, and thus overall render output, e.g. frame for display. This is generally advantageous, but may be particularly advantageous in contexts in which resources are limited, such as in portable devices, e.g. mobile phones and tablets.

It will be appreciated therefore, that the technology described herein provides an improved tile-based graphics processor.

The tile-based graphics processor (and pipeline) should, and in an embodiment does, generate an overall render output on a tile-by-tile basis. The render output (area) should thus be, and in an embodiment is, divided into plural rendering tiles for rendering purposes. In an embodiment, each rendering tile that the graphics processor (and pipeline) generates for a render output is generated in the manner of the technology described herein.

Thus, in an embodiment, the primitive providing stage (circuit) provides to the one or more (subsequent) processing stages of the graphics processing pipeline, the primitives for each rendering tile of a set of plural rendering tiles that a render output is divided into for rendering purposes, and it is in an embodiment determined whether one or more processing steps remaining to be performed for a respective rendering tile need not be performed (and processing step(s) are potentially omitted) each time there are no primitives left to be provided for a respective rendering tile of the render output.

The overall render output may comprise any suitable render output, such as frame for display, or render-to-texture output, etc. The render output will typically comprise an array of data elements (sampling points) (e.g. pixels), for each of which appropriate render output data (e.g. a set of colour value data) is generated by the graphics processor. The render output data may comprise colour data, for example, a set of red, green and blue, RGB values and a transparency (alpha, a) value. However, the render output data may comprise data other than colour data, such as depth (Z) and/or stencil (S) data.

The tiles that the render output is divided into for rendering purposes can be any suitable and desired such tiles. The size and shape of the rendering tiles may normally be dictated by the tile configuration that the graphics processor is configured to use and handle.

The rendering tiles are in an embodiment all the same size and shape (i.e. regularly-sized and shaped tiles are in an embodiment used), although this is not essential. The tiles are in an embodiment rectangular, and in an embodiment square. The size and number of tiles can be selected as desired. In an embodiment, each tile is 16×16, or 32×32 data elements (e.g. fragments or pixels) in size (with the render output then being divided into however many such tiles as are required for the render output size and shape that is being used).

To facilitate tile-based graphics processing, the tile-based graphics processor should, and in an embodiment does, include one or more tile buffers that store rendered data for a rendering tile being rendered by the tile-based graphics processor, until the tile-based graphics processor completes the rendering of the rendering tile.

The tile buffer may store an array or arrays of sample values for the tile in question, with the sample values in an embodiment being grouped into sets of one or more sample values (such as groups of 2×2 sample values) that are each associated with a respective (e.g. display) pixel. The sample values may, e.g., comprise colour values (a colour buffer), depth values (a depth buffer), stencil values (a stencil buffer), etc.

The tile buffer should be, and in an embodiment is, provided local to (i.e. on the same chip as) the tile-based graphics processor, for example, and in an embodiment, as part of RAM that is located on (local to) the graphics processor (chip). The tile buffer may accordingly have a fixed storage capacity, for example corresponding to the data (e.g. for an array or arrays of sample values) that the tile-based graphics processor needs to store for (only) a single rendering tile until the rendering of that tile is completed.

Once a rendering tile is completed by the tile-based graphics processor, rendered data for the rendering tile should be, and in an embodiment is, written out from the tile buffer to other storage that is in an embodiment external to (i.e. on a different chip to) the tile-based graphics processor, such as a frame buffer in external memory, for use.

Rendering tiles may be combined to form the render output in any suitable and desired manner. In an embodiment, when each rendering tile of a render output is completed by the graphics processor, output data for the rendering tile is written out from the tile buffer to external memory, such as a frame buffer, such that rendering tiles for the render output are combined in the external memory. The graphics processor in an embodiment includes a write out circuit coupled to the tile buffer for this purpose.

The external memory could be, and is in an embodiment, on a different chip to the graphics processor, and may, for example, be a main memory of the overall graphics processing system that the graphics processor is part of. It may be dedicated memory for this purpose or it may be part of a memory that is used for other data as well.

The primitive providing stage (circuit) can be any suitable and desired graphics processing stage (circuit) (of the graphics processing pipeline) that can provide primitives for processing to subsequent processing stages of the graphics processing pipeline. In an embodiment, the graphics processing pipeline includes (prior to the primitive providing stage) a primitive list preparing stage (a "tiler") that prepares primitive lists for respective regions of the render output, and the primitive providing stage (circuit) comprises (or is) a primitive list reader that reads primitives listed for a rendering tile by the primitive list preparing stage ("tiler"), and passes those read primitives to the one or more (subsequent) stages of the graphics processing pipeline for processing.

In this case, the regions of the render output that the primitive list preparing stage ("tiler") can prepare primitive lists for may correspond e.g. to single rendering tiles, or to sets of plural rendering tiles (e.g. in the case of "hierarchical tiling" arrangements). Accordingly, depending on how primitives are listed, the primitive list reader may read primitives for any particular rendering tile from a single primitive list or from plural primitive lists.

In this case, in an embodiment, the "end" of a rendering tile (that is, the lack of any primitives remaining to be provided for processing for the rendering tile) will be when there are no primitives (to be rasterised and rendered) listed in the primitive list(s) for the rendering tile that the primitive list reader has not read and passed to the one or more (subsequent) stages of the graphics processing pipeline for processing.

Thus, in an embodiment, the determining of whether one or more processing steps need not be performed is performed when there are (in response to there being) no primitives listed in the primitive list(s) for a rendering tile that have not been read and passed to the one or more (subsequent) stages of the graphics processing pipeline for processing (e.g. rasterising and rendering).

The determining of whether one or more processing steps need not be performed may be triggered upon reaching the "end" of a rendering tile in any suitable and desired manner.

In an embodiment, the determining of whether one or more processing steps need not be performed is triggered when it is recognised (i.e. in response to it being recognised) that there are no primitives left for the primitive providing stage (e.g. primitive list reader) to provide for processing to the one or more subsequent processing stages for the rendering tile.

For example, the e.g. primitive list reader could determine that the "end" of a rendering tile has been reached when there are no primitives left in the primitive list(s) for the rendering tile in question (that it has not read and passed on). In an embodiment, a marker included in the primitive list(s) for a rendering tile (explicitly) indicates the "end" of the rendering tile, and the e.g. primitive list reader recognises that the "end" of a rendering tile has been reached when it encounters such a marker. Such a marker may comprise, for example and in an embodiment, an end of tile flag, a new tile command, etc. The e.g. primitive list reader may, in response to recognising the "end" of a rendering tile, cause the determining of whether one or more processing steps need not be performed, e.g. by issuing an appropriate command.

Thus, in an embodiment the determining of whether one or more processing steps for a rendering tile need not be performed is performed in response to (the recognition of) there being no more primitives left for the primitive providing stage to provide for processing to the one or more subsequent processing stages of the graphics processing pipeline for the rendering tile.

In another embodiment, the determining of whether one or more processing steps need not be performed is triggered by a (e.g. the final) command listed in the primitive lists(s) for the rendering tile in question. In this case, the command may, for example, be included in the primitive list(s) for a (and in an embodiment each) rendering tile, in an embodiment by the primitive list preparing stage ("tiler").

Thus in an embodiment, the determining of whether one or more processing steps for a rendering tile need not be performed is performed in response to a command issued to the one or more subsequent processing stages of the graphics processing pipeline for the rendering tile. The command is in an embodiment the last command that the primitive providing stage (e.g. primitive list reader) provides to the one or more subsequent stages for the rendering tile in question.

The one or more (subsequent) processing stages of the graphics processing pipeline can be any suitable and desired graphics processing stages (circuits) that can process primitives provided for processing by the primitive providing stage (circuit) (e.g. primitive list reader).

In an embodiment, the one or more (subsequent) processing stages comprise (or are) one or more earlier processing stages and one or more later processing stages. It will be appreciated here that a later processing stage refers to a processing stage of the graphics processing pipeline that may perform its respective processing step(s) in respect of a primitive after an earlier processing stage, and thus may use a processing result generated by an earlier processing stage. For example, and in an embodiment, the one or more earlier processing stages comprise (or are) a rasteriser, and the one or more later processing stages comprise (or are) one or more fragment processing stages (circuits).

In this case, the rasteriser in an embodiment receives primitives from the primitive providing stage (circuit) (e.g. primitive list reader), rasterises those primitives to fragments, and provides the fragments to the (first one of the) one or more fragment processing stages (circuits) for processing. The one or more fragment processing stages (circuits) in an embodiment receive fragments from the rasteriser, and are operable to perform one or more fragment processing (e.g. rendering) steps (operations) on those fragments to generate rendered fragment data, which rendered fragment data may be written to (an appropriate buffer of) the tile buffer.

The rasteriser can rasterise primitives provided by the primitive providing stage (circuit) (e.g. primitive list reader) to fragments in any suitable and desired manner. In an embodiment, the rasteriser is configured to perform "hierarchical rasterisation". Thus, the rasteriser is in an embodiment operable to test primitives to be rasterised against progressively smaller patches (regions) of the render output area, e.g. and in an embodiment, in an iterative manner. Other arrangements for the rasteriser would be possible. For example, in other embodiments, the rasteriser rasterises primitives to fragments in a non-hierarchical manner.

The one or more fragment processing stages (circuits) can be any suitable graphics processing pipeline stages that can perform any appropriate fragment processing (e.g. rendering) steps (operations) in respect of fragments generated by the rasteriser.

The one or more fragment processing stages may comprise, for example, any one or more of: a fragment output buffer that is operable to issue fragments to a next stage of the graphics processing system; an (early and/or late) fragment depth or stencil testing stage that is operable to perform a fragment depth or stencil test, and to write out fragment depth or stencil test results to a (e.g. depth or stencil tile) buffer of the graphics processing system; and a fragment renderer that is operable to perform fragment rendering to generate rendered fragment data, and to write out rendered fragment data to a (e.g. colour tile) buffer of the graphics processing system. The fragment rendering may comprise, for example, texture mapping, blending, shading, etc.

As discussed above, in embodiments of the technology described herein, when there are no primitives left to be provided for processing (e.g. rasterising and rendering) for a rendering tile (i.e. when the "end" of a rendering tile has been reached), a determining operation is triggered in which it is determined (by the determining circuit) whether one or more processing steps (operations) that remain to be performed for the rendering tile can be omitted.

It will be appreciated here that the determining operation of the technology described herein should be performed in respect of a rendering tile after the primitive providing stage (circuit) (e.g. the primitive list reader) has provided all of the primitives that are to be processed (e.g. rasterised and rendered) for the rendering tile to the one or more (subsequent) processing stages for processing, but in an embodiment before the one or more (subsequent) processing stages have completed all of the processing steps in respect of those primitives, e.g. such that at the point in time at which it is determined whether a processing step can be omitted in respect of the rendering tile, there remains processing step(s) left to be performed (and so potentially omitted) in respect of the rendering tile in question.

Correspondingly, in an embodiment, the determining operation in respect of a rendering tile is performed after all of the primitives that the rasteriser is to rasterise for the rendering tile in question have been received by the rasteriser.

In an embodiment, the determining operation in respect of a rendering tile is performed after the rasteriser has completed the rasterisation of all of the primitives that the rasteriser is to rasterise for the rendering tile in question.

Correspondingly, in an embodiment, the determining operation in respect of a rendering tile is performed after all of the fragments that the one or more fragment processing stages are to process (e.g. render) for the rendering tile in question have been received by (at least the first of) the one or more fragment processing stages, but in an embodiment before the one or more fragment processing stages have completed all of the fragment processing in respect of those fragments.

It may be determined (by the determining circuit) that one or more processing steps (operations) need not be performed for any suitable and desired reasons, and based on any suitable and desired criteria.

In an embodiment, a processing step (e.g. operation) that remains to be performed for a rendering tile upon reaching the "end" of the rendering tile can be omitted if it can be determined that that processing step will not affect a buffer (of the tiles buffers) that will be output (to the main memory) when the graphics processor completes the rendering tile (i.e. when all of the processing steps to be performed by the one or more (subsequent) processing stages for the rendering tile have been completed).

Thus, in an embodiment, it is determined (by the determining circuit) that a processing step (e.g. operation) need not be performed when it is determined that the processing step will not affect an output buffer, i.e. a buffer to be written out from the tile buffer upon completing the rendering tile in question.

It will be appreciated here that it may typically be the case that only a colour buffer (in the tile buffer) will be output to (a frame buffer in) the e.g. main memory once a rendering tile has been completed by the graphics processor, and other buffers, e.g. depth (Z) and stencil (S) buffers, will typically not be output to the e.g. main memory. Thus, in an embodiment, an output buffer (i.e. a buffer to be written out from the tile buffer upon completing the rendering tile in question) is a colour buffer, and other buffers, such as depth and/or stencil buffers are not output buffers.

However, other output buffers are possible. For example, there could be plural different, e.g. colour, output buffers. Moreover, a depth and/or stencil buffer(s) could be an output buffer. For example, in the case of a deferred rendering scheme, a depth buffer may be an output buffer for an initial depth only rendering pass.

It may be determined (by the determining circuit) that a processing step (e.g. operation) will not affect an output buffer (i.e. a buffer to be written out from the tile buffer upon completing the rendering tile in question) in any suitable and desired manner.

In an embodiment, it may be determined (by the determining circuit) that a processing step (e.g. operation) will not affect an output buffer when the processing step is a processing step in respect of a primitive that does not (directly) write to an output buffer (e.g. when the processing step is a processing step in respect of a primitive that writes to another buffer, such as a depth and/or stencil buffer).

Thus, in an embodiment, it is determined whether a primitive does not write data to an output buffer (i.e. a buffer to be written out from the tile buffer upon completing the rendering tile in question), and it is determined that a processing step to be performed in respect of the primitive need not be performed when it is determined that the primitive does not write data to an output buffer.

As well as considering whether a primitive will directly write to an output buffer, the possibility of a primitive indirectly affecting a write to an output buffer may also be taken into account. For example, it could be the case that even though a first primitive does not itself directly write to an output buffer, the processing of the first primitive will affect the processing of a second primitive that will write to an output buffer. This may be achieved as desired.

In an embodiment, it may be determined (by the determining circuit) that a processing step (e.g. operation) cannot (directly or indirectly) affect an output buffer when the processing step is a processing step in respect of a primitive that does not itself write data to an output buffer, and which was provided for processing by the primitive providing stage (circuit) after any other primitives for the rendering tile that do write data to an output buffer.

Thus, in an embodiment, it is determined whether a primitive was provided for processing by the primitive providing stage (circuit) after any other primitives for the rendering tile that write data to an output buffer (i.e. a buffer to be written out from the tile buffer upon completing the rendering tile in question), and it is determined that a processing step (e.g. operation) to be performed in respect of the primitive need not be performed when it is determined that the primitive (does not write data to an output buffer and) was provided for processing by the primitive providing stage (circuit) after any other primitives for the rendering tile that write data to an output buffer.

A processing step (e.g. operation) in respect of a primitive may be caused to be omitted in any suitable and desired manner.

In an embodiment, a command is issued to the one or more (subsequent) processing stages that triggers one or more of the one or more (subsequent) processing stages to determine that a processing step or steps to be performed in respect of a primitive that does not affect a buffer to be written out from the tile buffer need not be performed. The command may be provided by the primitive list providing stage (e.g. primitive list reader), e.g. as described above.

In an embodiment, the one or more later (e.g. fragment) processing stages of the graphics processing pipeline can be caused, by the one or more earlier processing stages (e.g. the rasteriser), to omit performing one or more processing steps in respect of (fragments for) a primitive. It will be appreciated that in these embodiments, the one or more earlier processing stages may comprise the determining circuit.

In this case, in an embodiment, the one or more later (e.g. fragment) processing stages of the graphics processing pipeline are caused, by the one or more earlier processing stages (e.g. the rasteriser), to omit performing one or more processing steps in respect of (fragments for) a primitive that does not affect (that has been determined as not affecting) an output buffer (i.e. a buffer to be written out from the tile buffer upon completing the rendering tile in question).

In one such embodiment, the one or more earlier processing stages (e.g. the rasteriser) of the graphics processing pipeline are operable to determine whether a primitive will be overdrawn such that one or more processing steps (e.g. operations) to be performed by the one or more later (e.g. fragment) processing stages of the graphics processing pipeline in respect of the primitive need not be performed, and to, when it is determined that a primitive will be overdrawn such that one or more processing steps to be performed by the one or more later (e.g. fragment) processing stages in respect of the primitive need not be performed, cause the one or more later (e.g. fragment) processing stages to omit performing the one or more processing steps in respect of the primitive.

In this case, in an embodiment, when there are no more primitives left for the primitive providing stage (circuit) to provide for processing to the one or more (subsequent) processing stages of the graphics processing pipeline for the rendering tile, the one or more earlier processing stages (e.g. the rasteriser) are caused to determine that a primitive that does not affect an output buffer will be overdrawn such that one or more processing steps (operations) to be performed by the one or more later (e.g. fragment) processing stages in respect of the primitive that does not affect an output buffer need not be performed, and to therefore cause the one or more later (e.g. fragment) processing stages to omit performing the one or more processing steps in respect of the primitive that does not affect an output buffer.

The one or more earlier processing stages (e.g. the rasteriser) may be caused to determine that a primitive that does not affect an output buffer will be overdrawn in any suitable and desired manner.

In an embodiment, a (the) command is issued to the one or more earlier processing stages (e.g. the rasteriser) that triggers the one or more earlier processing stages to determine that the primitive that does not affect a buffer to be written out from the tile buffer will be overdrawn. In this case, the command may indicate that the entirety of one or more, or all, non-output buffers (i.e. one or more, or all, buffers that will not be written out from the tile buffer upon completing the rendering tile in question) are to be overwritten.

In an embodiment, the one or more earlier processing stages (e.g. the rasteriser) of the graphics processing pipeline are operable to determine whether a later primitive will overdraw an earlier primitive such that one or more processing steps (e.g. operations) to be performed by the one or more later (e.g. fragment) processing stages of the graphics processing pipeline in respect of the earlier primitive need not be performed, and to, when it is determined that a later primitive will overdraw an earlier primitive such that one or more processing steps to be performed by the one or more later (e.g. fragment) processing stages in respect of the earlier primitive need not be performed, cause the one or more later (e.g. fragment) processing stages to omit performing the one or more processing steps in respect of the earlier primitive.

It will be appreciated here that a later primitive refers to a primitive that was provided for processing by the primitive providing stage (circuit) (e.g. primitive list reader) (and e.g. received by the one or more earlier processing stages (e.g. the rasteriser)) after an earlier primitive was provided for processing by the primitive providing stage (circuit) (e.g. primitive list reader) (and e.g. received by the one or more earlier processing stages (e.g. the rasteriser)).

In an embodiment, the command issued to the one or more earlier processing stages (e.g. the rasteriser) is in the form of a "dummy primitive". Thus, in an embodiment, the one or more earlier processing stages (e.g. the rasteriser) are caused to determine that a primitive that does not affect an output buffer will be overdrawn by providing to the one or more earlier processing stages (e.g. the rasteriser), a dummy primitive that will trigger the one or more earlier processing stages (e.g. the rasteriser) to determine that the dummy primitive will overdraw a primitive that does not affect an output buffer.

In this case, the dummy primitive may be a primitive covering the entire rendering tile, and that is set to overwrite one or more non-output buffers (i.e. one or more buffers that will not be written out from the tile buffer upon completing the rendering tile in question), e.g. all buffers except output buffer(s). The dummy primitive should be provided to the one or more earlier processing stages (e.g. the rasteriser) after all of the "regular" (e.g. primitive list(s) listed) primitives have been provided to the one or more earlier processing stages (e.g. the rasteriser) by the primitive providing stage (circuit) (e.g. primitive list reader) for the rendering tile in question, and the one or more earlier processing stages (e.g. the rasteriser) may respond to the dummy primitive substantially as they would do for a "regular" primitive, and thus, in particular, trigger one or more later (e.g. fragment) processing stages to omit performing the appropriate processing step(s) in respect of primitive(s) for the rendering tile.

The one or more earlier processing stages (e.g. the rasteriser) can indicate to the one or more later (e.g. fragment) processing stages that one or more processing steps should be omitted (and thereby trigger the one or more later (e.g. fragment) processing stages to omit performing those steps) in any suitable and desired manner, and using any suitable mechanism.

In an embodiment, one or more earlier processing stages (e.g. the rasteriser) can send a signal to one or more later (e.g. fragment) processing stages that indicates to the one or more later (e.g. fragment) processing stages that one or more (e.g. fragment) processing steps should be omitted.

Thus, in an embodiment, the one or more earlier processing stages (e.g. the rasteriser) are operable to cause the one or more later (e.g. fragment) processing stages to omit performing one or more processing steps in respect of a primitive by sending a signal to the one or more later (e.g. fragment) processing stages that indicates that the one or more processing steps in respect of the primitive need not be performed, and the one or more later (e.g. fragment) processing stages are in an embodiment operable to omit performing one or more processing steps in respect of a primitive in response to receiving a signal from the one or more earlier processing stages (e.g. the rasteriser) that indicates that the one or more processing steps in respect of the primitive need not be performed.

In this case, the one or more earlier processing stages (e.g. the rasteriser) in an embodiment cause the one or more later processing stages to omit performing one or more processing steps (e.g. operations) in respect of a primitive that does not affect an output buffer by sending a signal to the one or more later (e.g. fragment) processing stages that indicates that the one or more processing steps in respect of the primitive that does not affect an output buffer need not be performed.

The graphics processing pipeline may include such a signalling mechanism solely for the purposes of omitting processing steps upon reaching the "end" of a rendering tile. However, in an embodiment, the signalling mechanism is used (also) for other purposes, such as, and in an embodiment, "Forward Pixel Kill" (FPK) purposes, e.g. and in an embodiment as described in US 2014/0168220 and/or US 2014/0354654, the entire contents of which are hereby incorporated by reference. Thus, the graphics processor of the technology described herein may be configured to perform "Forward Pixel Kill" (FPK), and include any one or more, or all, of the features as described in any one or both of these documents, as appropriate. For example, it may be determined that a later primitive will overdraw an earlier primitive as described in any one or both of these documents.

In another embodiment, one or more earlier processing stages (e.g. the rasteriser) can indicate to one or more later (e.g. fragment) processing stages that one or more processing steps should be omitted by updating metadata that the one or more later (e.g. fragment) processing stages query to determine whether a processing step to be performed should be omitted.

Thus, in an embodiment, the one or more later (e.g. fragment) processing stages are operable to, prior to performing (in an embodiment each of) one or more (e.g. fragment) processing steps (e.g. operations) in respect of a primitive, determine whether metadata stored for the primitive indicates that the one or more (e.g. fragment) processing steps need not be performed, and to, when it is determined that metadata stored for the primitive indicates that the one or more (e.g. fragment) processing steps need not be performed, omit performing the one or more (e.g. fragment) processing steps; and the one or more earlier processing stages (e.g. the rasteriser) are in an embodiment operable to cause the one or more later (e.g. fragment) processing stages to omit performing one or more (e.g. fragment) processing steps in respect of a primitive by storing metadata for the primitive that indicates that the one or more (e.g. fragment) processing steps need not be performed.

In this case, the one or more earlier processing stages (e.g. the rasteriser) in an embodiment cause the one or more later (e.g. fragment) processing stages to omit performing one or more (e.g. fragment) processing steps in respect of a primitive that does not affect an output buffer by storing metadata for the primitive that does not affect an output buffer that indicates that the one or more (e.g. fragment) processing steps in respect of the primitive that does not affect an output buffer need not be performed.

The graphics processing pipeline may include such a metadata mechanism solely for the purposes of omitting processing steps upon reaching the "end" of a rendering tile. However, in an embodiment, the metadata mechanism is used (also) for other purposes, such as, and in an embodiment, "Patch Forward Pixel Kill" (PFPK) purposes, e.g. and in an embodiment as described in US 2020/0074721, the entire contents of which is hereby incorporated by reference. Thus, the graphics processor of the technology described herein may be configured to perform "Patch Forward Pixel Kill" (PFPK), and include any one or more, or all, of the features as described in this document, as appropriate. For example, it may be determined that a later primitive will overdraw an earlier primitive as described in this document.

Thus, in an embodiment, as well as determining whether one or more processing steps can be omitted (and (potentially) omitting those processing steps) when there are (in response to there being) no more primitives left for the primitive providing stage (circuit) to provide for processing to the one or more (subsequent) processing stages for the rendering tile, it is determined whether one or more processing steps can be omitted (and those processing steps (potentially) omitted) in response to the one or more (subsequent) processing stages receiving one or more, and in an embodiment each, primitive provided for processing by the primitive providing stage (circuit) for the rendering tile.

As well as indicating whether one or more processing steps in respect of a primitive need not be performed, the metadata may include any other suitable information. In an embodiment, the metadata is arranged and used as described in US 2020/0074721. In an embodiment, the metadata data (also) indicates the one or more buffers (of the tile buffer) that a primitive writes to. Thus, in an embodiment, the metadata is consulted when determining whether a primitive directly affects, i.e. writes data to, an output buffer, in an embodiment by querying the metadata for the primitive in question.

In an embodiment, when determining whether a primitive that does not affect an output buffer will be (apparently) overdrawn (by a dummy primitive), plural sets of metadata stored respectively for plural earlier primitives for the rendering tile are searched through to identify whether any of those earlier primitives for the rendering tile are primitives that do not write to an output buffer and will be (apparently) overdrawn (by a dummy primitive).

The metadata may also be consulted to determine whether a primitive could indirectly affect an output buffer. In an embodiment, the metadata searching is conducted sequentially backwards (e.g. in an opposite order to the order in which the primitives were provided by the primitive providing stage (circuit)) though the plural sets of metadata stored respectively for the plural earlier primitives for the rendering tile, and the searching is terminated when it is determined that at least one of the plural earlier primitives for the rendering tile will not be (apparently) overdrawn (by a dummy primitive). This may help to avoid inadvertently identifying earlier primitives whose processing may impact on the processing of later primitives.

The one or more processing steps that are (potentially) omitted in respect of a primitive can be any suitable processing steps. (It will be appreciated here that a processing step that is omitted in respect of a primitive may be performed (i.e. not omitted) for another primitive.)

For example, the one or more processing steps that may be omitted may comprise any one or more, or all, of: a step of performing a fragment depth or stencil test; a step of writing out fragment depth or stencil test results to a buffer of the graphics processing system; a step of performing fragment rendering to generate rendered fragment data; and a step of writing out rendered fragment data to a buffer of the graphics processing system.

The one or more processing steps that may be omitted may comprise one or more specific processing operations that the one or more (subsequent) processing stages of the graphics processing pipeline would otherwise perform in respect of a primitive, for example, and in an embodiment, as described in US 2020/0074721.

In an embodiment, the one or more processing steps that may be omitted comprise all of the processing steps that remain to be performed in respect of a primitive for the rendering tile. Accordingly, in an embodiment, the effect of omitting the one or more processing steps will be that a primitive (that does not affect an output buffer) is discarded from further processing, i.e. "killed", for the particular rendering tile in question. (It will be appreciated here that a primitive that has been discarded ("killed") for a particular rendering tile may be processed for a different rendering tile).

This may be achieved in any suitable and desired manner. In an embodiment, a (and in an embodiment each) fragment processing stage is operable to issue fragments to a next fragment processing stage or buffer of the graphics processing system, and a (and in an embodiment each) fragment processing stage is operable to "kill" one or more fragments by not issuing (omitting issuing) the one or more fragments to the next fragment processing stage or buffer. Thus, the one or more processing steps that may be omitted in an embodiment comprise a step of issuing one or more fragments for a primitive to a next processing stage or buffer of the graphics processing system.

It will be appreciated here that the effect of omitting issuing a fragment to a next processing stage or buffer of the graphics processing system will be that no further processing steps will be performed in respect of that fragment. Thus, the fragment will be, in effect, "killed". Correspondingly, omitting issuing all fragments for a primitive to a next processing stage or buffer of the graphics processing system will (and in an embodiment does) result in no further processing steps being performed in respect of that primitive. That is, the primitive will be, in effect, "killed".

It will be appreciated, therefore, that in an embodiment of the technology described herein, when there are (and in an embodiment in response to there being) no more primitives left for the primitive providing stage (circuit) to provide for processing to the one or more (subsequent) processing stages of the graphics processing pipeline for the rendering tile, one or more primitives in the pipeline for the rendering tile that will not affect an output buffer (i.e. a buffer to be written out from the tile buffer upon completing the rendering tile in question) are identified, and (fragments for) the identified one or more primitives are discarded from further processing (i.e. "killed").

It will be appreciated that in embodiments of the technology described herein, processing steps may be omitted in respect of plural primitives that are, e.g. identified as not affecting an output buffer. Similarly, it will be appreciated that in embodiments of the technology described herein, the render output may be a render output, e.g. output frame, in a sequence of plural such render outputs, e.g. output frames, that the graphics processor generates. In this case, each render output that the graphics processor (and pipeline) generates is in an embodiment generated in the manner of the technology described herein.

It will furthermore be appreciated that, the graphics processor of the technology described herein may be part of an overall graphics processing system that includes, e.g., and in an embodiment, a host processor that, e.g., executes applications that require processing by the graphics processor (and, optionally, a display). The host processor will send appropriate commands and data to the graphics processor to control it to perform graphics processing operations and to produce graphics processing output required by applications executing on the host processor. To facilitate this, the host processor should, and in an embodiment does, also execute a driver for the graphics processor. The host processor may also execute a compiler or compilers for compiling programs to be executed by (e.g., a programmable processing stage (shader) of the) graphics processor.

The graphics processor may also comprise, and/or be in communication with, one or more memories and/or memory devices that store the data described herein, and/or the output data generated by the graphics processor, and/or store software (e.g. program) for performing the processes described herein. The graphics processor may also be in communication with a host microprocessor, and/or with a display for displaying images based on the data generated by the graphics processor.

The technology described herein can be used for all forms of output that a graphics processor may be used to generate. For example, the graphics processor may generate frames for display, render-to-texture outputs, etc. The output data values from the processing are in an embodiment exported to external, e.g. main, memory, for storage and use, such as to a frame buffer for a display.

In an embodiment, the various functions of the technology described herein are carried out on a single graphics processing platform that generates and outputs data (such as rendered fragment data that is, e.g., written to the frame buffer), for example for a display device.

The technology described herein can be implemented in any suitable system, such as a suitably operable microprocessor based system. In some embodiments, the technology described herein is implemented in a computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

As discussed above, the technology described herein relates to arrangements in which, upon reaching the end of a rendering tile, it is determined whether any processing steps (e.g. operations) left to be performed by a graphics processing pipeline for the rendering tile can be omitted, e.g. because they will not affect a buffer that will be output when the rendering tile is complete. When it is determined that a processing step can be omitted, that processing step is omitted. This means that processing steps which the pipeline would otherwise perform can be omitted, such that the overall processing effort required to generate a rendering tile can be reduced.

FIG. 1 shows schematically a graphics processing system that may be operated in accordance with an embodiment of the technology described herein.

An application 2, such as a game, executing on a host processor 1 may require graphics processing operations to be performed by an associated graphics pipeline that is implemented by means of a graphics processing unit (GPU) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

Figure 2:
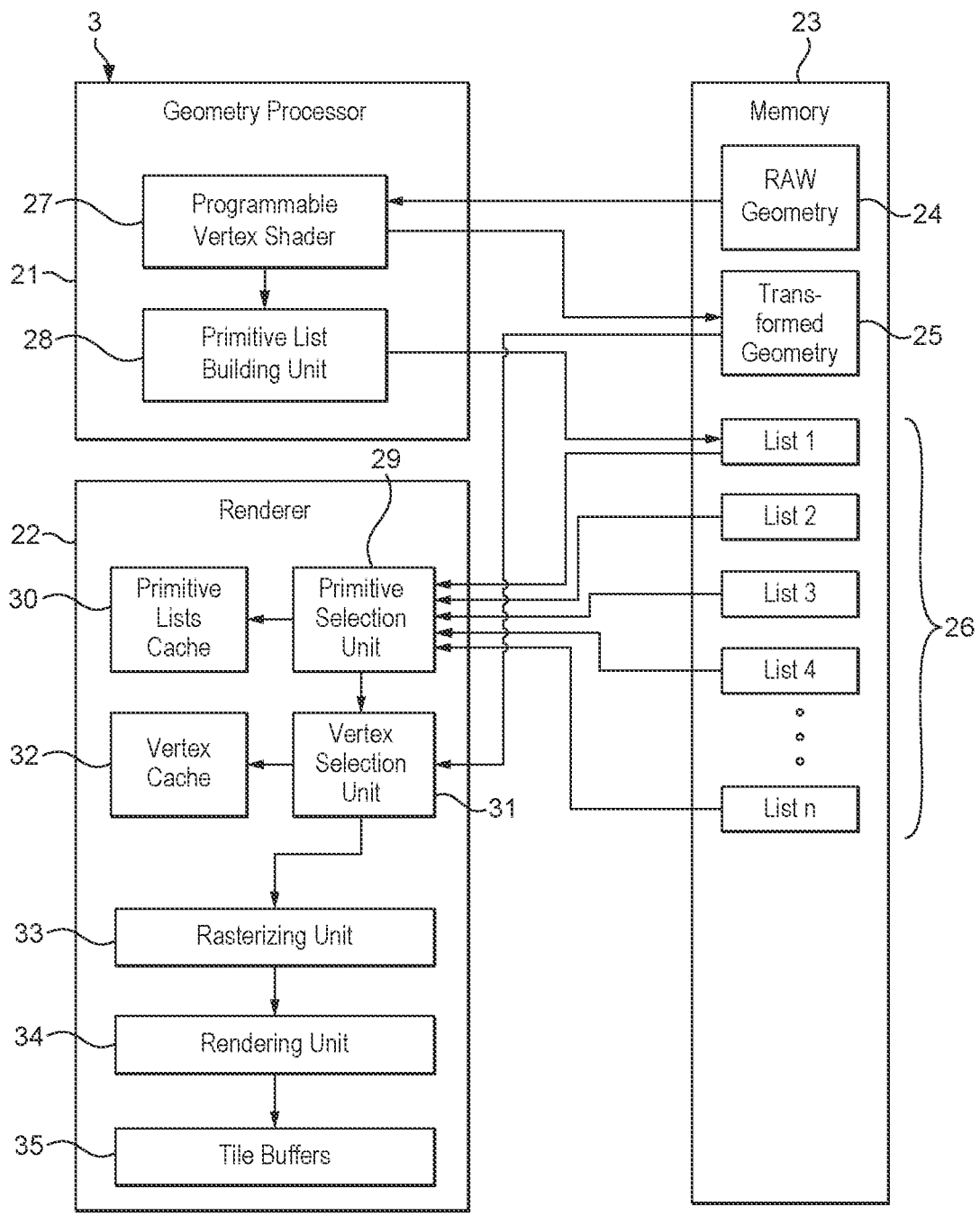
FIG. 2 shows schematically and in more detail processing stages of a graphics processing system that can be operated in accordance with embodiments of the technology described herein.

FIG. 2 shows schematically the graphics processor 3 in more detail.

The graphics processor 3 shown in FIG. 2 is a tile-based graphics processor that executes a tile-based graphics processing pipeline, and will thus produce rendering tiles of a render output data array, such as an output frame to be generated.

The render output data array may typically be an output frame intended for display on a display device, such as a screen or printer, but may also, for example, comprise intermediate data intended for use in later rendering passes (also known as a "render to texture" output), etc.

FIG. 2 shows the main elements and pipeline stages of the tile-based graphics processing pipeline executed by the tile-based graphics processor 3. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the tile-based graphics processor 3 includes a geometry processor 21, and a renderer 22, both of which can access a memory 23, which, in the present embodiment, is a main memory of the overall graphics processing system.

The memory 23 stores, inter alia, and as shown in FIG. 2, a set of raw geometry data 24 (which is, for example, provided by the graphics processor driver 4 or an API running on the host system 1 (microprocessor)), a set of transformed geometry data 25 (which is the result of various transformation and processing operations carried out on the raw geometry 24), and a set of primitive lists 26. The primitive lists 26 contain data, commands, etc., for the respective primitives. The transformed geometry data 25 comprises, for example, transformed vertices (vertex data), etc.

The geometry processor 21 comprises, inter alia, a programmable vertex shader 27, and a primitive list building unit 28. The programmable vertex shader 27 takes as it input the raw geometry data 24 stored in the memory 23, and processes that data to provide transformed geometry data 25 (which it then stores in the memory 23) comprising the geometry data in a form that is ready for 2D placement in the render output (e.g. frame to be displayed).

The primitive list building unit ("tiler") 28 performs the process of "tiling" to allocate primitives to the primitive lists which are then used by the renderer 22 to identify the primitives that should be rendered for each rendering tile that is to be rendered to generate the render output (frame to be rendered for display). To do this, the primitive list building unit 28 takes as its input the transformed and processed vertex (geometry) data 25 from the programmable vertex shader 27 (i.e. the positions of the primitives in the frame), builds primitive lists using that data, and stores those lists as the primitive lists 26 in the memory 23.

The renderer 22 includes a primitive selection unit 29, a primitive list cache 30, a vertex selection unit 31, a vertex data cache 32, a rasterising unit 33, a rendering unit 34, and tile buffers 35.

The primitive selection unit 29 of the renderer 22 determines which primitive is to be rendered next. It does this by considering the primitive lists 26 stored in the memory 23, and selecting from one of those lists the next primitive to be rendered. The primitive selection unit 29 can also place one or more primitive lists in the primitive list cache 30 as appropriate.

The primitive selection unit 29 passes the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

The rasterising unit 33 then rasterises the primitive to fragments, and provides those fragments to the rendering unit 34 for rendering. The rendering unit 34 performs a number of fragment processing (rendering) operations, such as texture mapping, blending, shading, etc. on the fragments, to generate rendered fragment data for the fragments representing the primitive, and stores the rendered fragment data in the tile buffers 35.

The tile buffer 25 is provided as part of RAM that is located on (local to) the graphics processor 3 (chip). The tile buffer 25 stores colour buffers that store an appropriate colour (and other appropriate data, such as Multiple Render Target data, e.g. a surface normal, etc.) for each sampling point that the buffers represent (in essence for each sampling point of a tile that is being processed).

Once each tile has been processed, its data is, e.g., exported from the tile buffers 35 to the main memory 23 (e.g. to a frame buffer (not shown) in the main memory 23) for storage, and the next tile is then processed, and so on, until sufficient tiles have been processed to generate the entire render output (e.g. frame (image) to be displayed).

Figure 3:
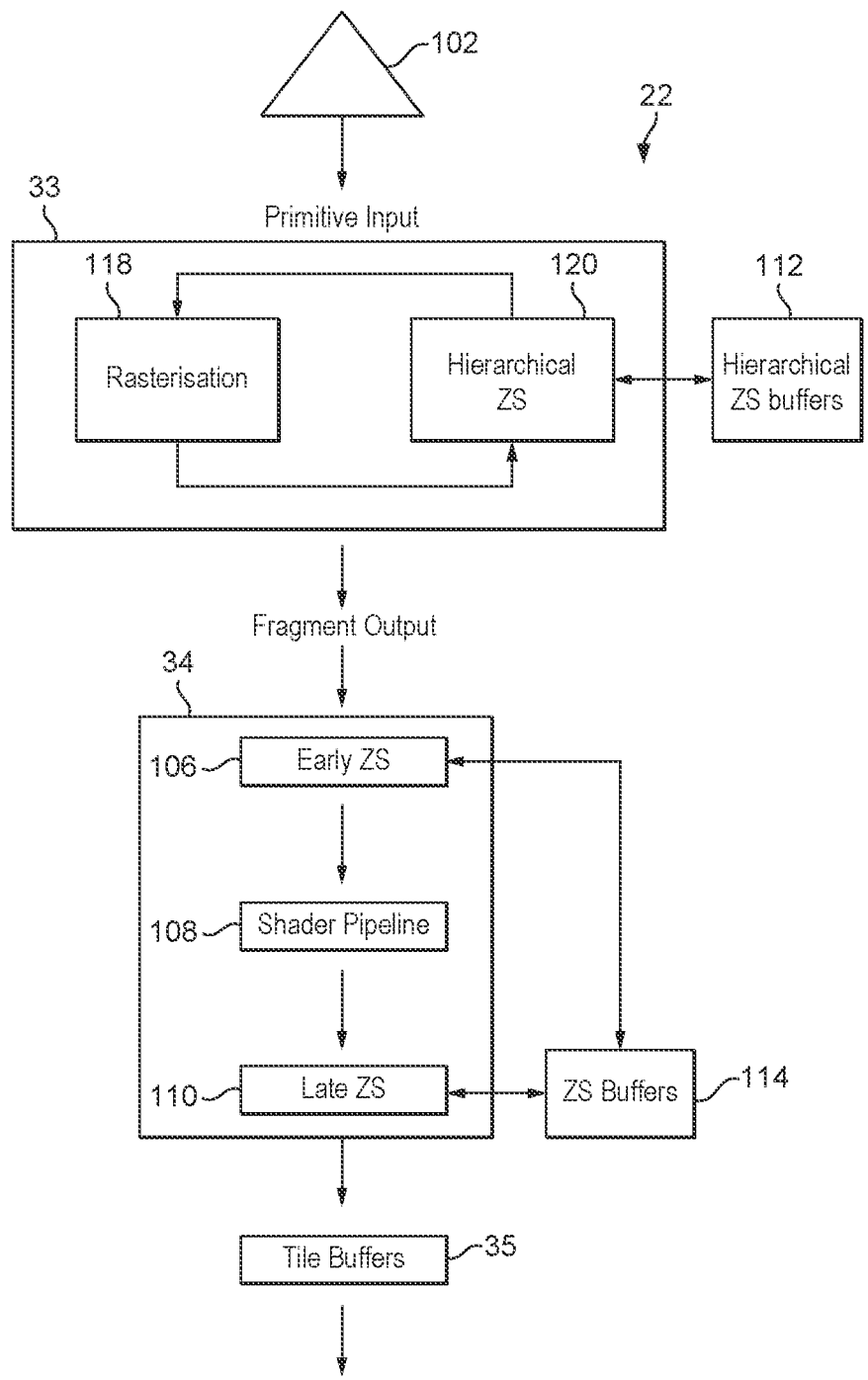
FIG. 3 shows schematically and in more detail processing stages of a graphics processing system that can be operated in accordance with embodiments of the technology described herein.

FIG. 3 shows schematically the rasterising unit 33, rendering unit 34, and tile buffers 35 of the renderer 22 of the tile-based graphics processing pipeline 3 of the present embodiment in more detail.

As illustrated in FIG. 3, the rasteriser 33 operates to rasterise primitives 102 making up the render output (e.g. the image to be displayed) into graphics fragments for processing. To do this, the rasteriser 33 receives graphics primitives 102 to be rendered selected by the primitive selection unit 29 from the vertex selection unit 31, rasterises the primitives 102 to sampling points, and generates graphics fragments having appropriate positions (representing appropriate sampling positions) for rendering the primitives 102. In the present embodiment, a graphics fragment that is generated by the rasteriser 33 can represent (have associated with it) a set of one or more, such as four, sampling positions.

In the present embodiment, the rasteriser 33 is a hierarchical rasteriser that may iteratively test primitives 102 against progressively smaller patches (regions) of the render output (target) area (and thus, correspondingly, patches of fragments), starting from a largest patch size, down (potentially) to a minimum patch size, discarding (culling) any patches that are not (at least in part) covered by the primitive 102. Each patch that is tested corresponds to a given area of the render output, e.g. frame, being generated (and thus to a given set of fragments).

In the present embodiment, the largest patch size that the rasteriser 33 can test primitives against corresponds to the size of an entire rendering tile, which in the present embodiment corresponds to 16×16 fragments. The minimum patch size corresponds, in the present embodiment, to a 2×2 group of fragments (i.e. to an array of sampling points that would be rasterised to a 2×2 group of fragments). Other arrangements would be possible.

The rasterisation stage 118 of the rasteriser 33 performs this render output patch testing. To do this, it starts with a largest (16×16) patch of the render output area and tests the patch against the edges of the primitive 102 in question to determine if the primitive completely covers the largest patch or at least partially covers the largest patch (i.e. at least partially covers any patch of a 2×2 set of smaller patches of the render output that the largest patch is divided into (encompasses)).

The edges of the primitive 102 are represented by appropriate line (edge) equations that have been derived from the vertices of the primitive, and a grid of sampling points is derived for the patch (and for each patch) being tested. The patch sampling points are then used with the line equations representing the edges of the primitive in question to perform an edge test for the edges to determine if the patch is at least partially covered by the primitive.

In the present embodiment, the rasterisation stage 118 determines that a patch of the render output is at least partially covered by a primitive if at least one of the following conditions is met: at least one edge of the patch is within the primitive; at least one edge of the patch is crossed by an edge of the primitive; at least one vertex of the primitive is within the patch; or at least one vertex of the primitive is on a patch edge and, if the vertex is on the patch edge, another vertex of the primitive is on another edge of the patch, or if the vertex is on a corner of the patch, another vertex is on the opposite corner or on one of the opposite edges of the patch.

The rasterisation stage determines that a patch of the render output is completely covered by a primitive if that patch is found to entirely pass the edge test for each of (for all of) the edges of the primitive.

If it is found that the largest patch is not covered by the primitive 102 at all, then the patch is not processed further in respect of the primitive 102 in question (i.e. the entire patch is discarded for the primitive in question), and another (the next) largest patch may then be tested against the primitive, and so on.

On the other hand, if the primitive is found to at least partially cover the largest (i.e. at least partially cover any of the smaller patches of the set of plural smaller patches of the render output that the largest patch encompasses (is divided into)), then the largest patch is forwarded by the rasterisation stage 118 to the hierarchical depth and stencil (ZS) test stage 120 of the rasteriser 33.

The hierarchical depth and stencil (ZS) test stage 120 is operable to perform initial hierarchical depth and stencil tests on each of the patches considered by the rasteriser 33 to see if those patches can be culled. To do this, the hierarchical ZS test stage 120 performs an initial depth (Z) test on each at least partially covered patch to see if the patch can be discarded or "culled" at this stage. At the same time, an initial stencil (S) test is carried out.

The rasteriser 33 is accordingly in communication with hierarchical ZS buffer(s) 112. The hierarchical ZS buffer(s) 112 can store depth data (such as a range of depth values and/or depth function data) and a stencil value for each patch size and position that the buffer represents (essentially for each patch size and position that the rasteriser 33 could consider for the tile that is being processed).

In the present embodiment, the hierarchical ZS test stage 120 performs a hierarchical depth test on a patch, using a depth value range representative of the primitive 102 that at least partially covers that patch, by taking appropriate depth samples for the patch in respect of the primitive, and comparing the depth samples for the patch with the depth range data already stored in the corresponding entry for that patch position, to try to determine whether that patch will be occluded by or will overdraw other fragments and sampling points to be rendered. If the patch passes the hierarchical depth test, then the depth value ranges stored in that entry of the hierarchical ZS buffer(s) 112 are updated accordingly.

According to the outcome of the depth and stencil tests performed by the hierarchical test stage 120, the largest patch may be returned to the rasterisation stage 118 to be subdivided into its four smaller patches, with each covered such smaller patch ("sub-patch") then tested against the primitive and processed in the same way (i.e. discarded, or forwarded to the hierarchical depth testing stage 120 and later returned to the rasterisation stage 118 and subdivided into a set of smaller patches). This patch testing and discarding or subdivision is continued until the minimum patch size is reached.

The present embodiment supports four levels of subdivision (three sub-division iterations) and so can start with largest patches having an area corresponding to 16×16 fragments (corresponding to the size of an entire tile). A 16×16 fragment patch is then (if appropriate) subdivided into four 8×8 fragment patches. Each of those 8×8 fragment patches is then subdivided into respective 4×4 fragment patches (if appropriate). Finally, each 4×4 fragment patch is subdivided into respective 2×2 fragment patches (if appropriate). As in the present embodiment, a 2×2 fragment patch is the minimum patch size that is used, the (potential) subdivision process stops at this point. Other arrangements would be possible. For example, other numbers of subdivision levels, such as three or five, could be used.

Once the minimum patch size has been reached (i.e. a patch of 2×2 fragments that covers, at least in part, the primitive has been identified), the rasterisation stage 118 then tests the individual sampling points in that final patch to see if the sampling points are covered by the primitive 102. The rasteriser 33 then generates and outputs individual fragments for rendering corresponding to the sampling points found to be covered by the primitive (so four fragments if all the 2×2 fragments in the minimum size patch are at least partially covered by the primitive).

The rasteriser 33 also associates with each fragment a coverage mask in the form of a bitmap that indicates, for each sample position of the set of one or more sample positions that is associated with the fragment, whether that sample position is covered (i.e., in effect, whether the fragment is being used to render that sampling point (i.e. whether its data should be stored for that sampling point)).

Once a primitive has been tested in this manner, then the rasterisation process moves on to the next primitive for the tile being generated and so on, until all the primitives for the tile in question have been rasterised.

The process then moves on to the next rendering tile to be generated, and so on.

Once all the primitives for the render output in question have been rasterised, the process then moves on to the next render output, e.g. frame, to be generated, and so on.

The rasteriser 33 is configured in the present embodiment as a pipeline that can contain and process plural patches at the same time. The rasteriser 33 is also configured to be able to generate plural fragments at a time (simultaneously) (e.g. where a primitive is found to completely cover a patch of the render output that encompasses plural fragments (e.g. plural sampling points or sets of sampling points)). The fragments are still processed individually by the fragment processing parts of the pipeline, such as the fragment shader 108. Having the rasteriser produce plural fragments simultaneously helps to create back pressure to thereby keep the rendering pipeline "filled up" with fragments.

Other arrangements would be possible. For example, other embodiments are contemplated in which a non-hierarchical rasteriser is used. In these embodiments, the rasteriser may still perform primitive coverage testing and initial depth and/or stencil testing in respect of a region (e.g. tile) of the render output as discussed above, but without the capability to iteratively subdivide the region for further testing.

Figure 4:
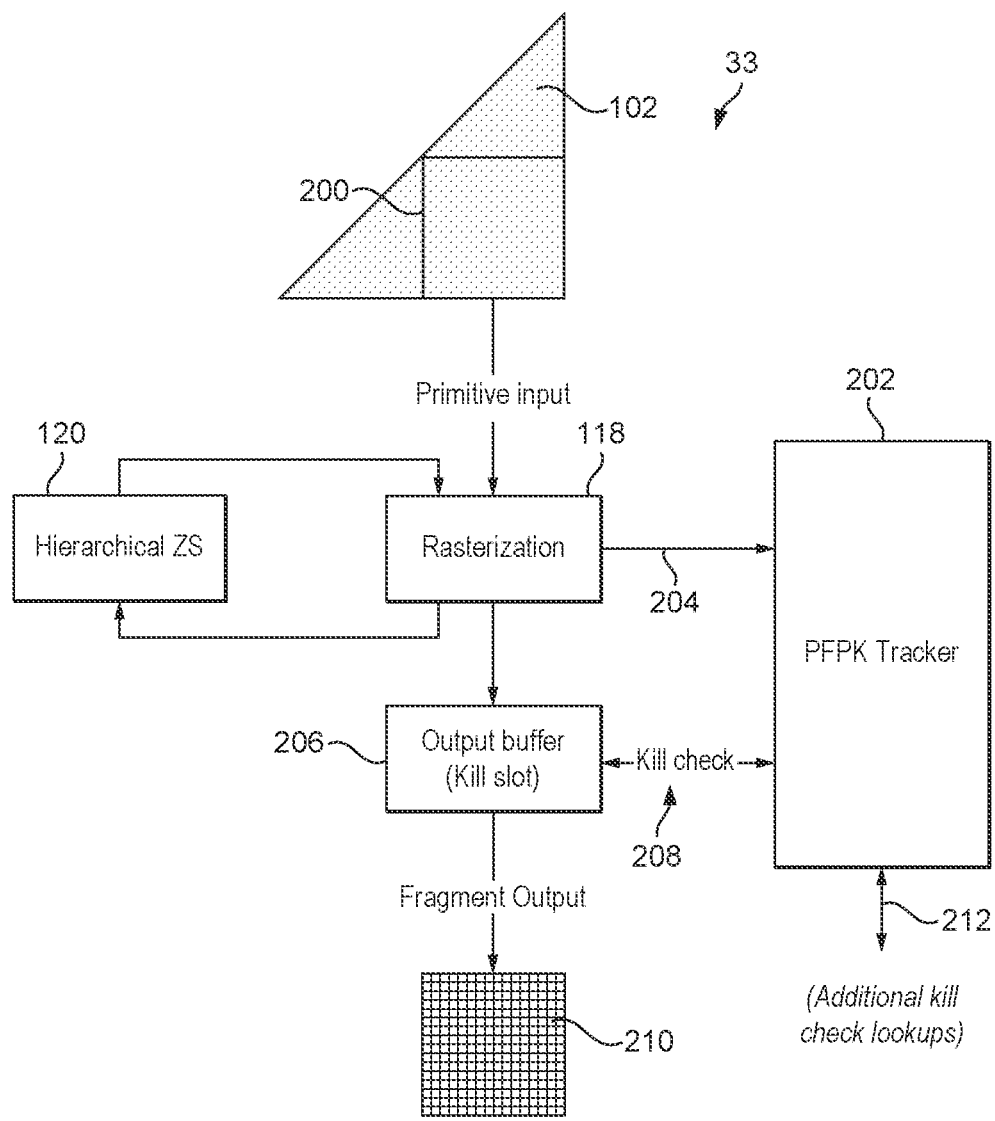
FIG. 4 shows schematically and in more detail processing stages of a rasteriser of a graphics processing system that can be operated in accordance with embodiments of the technology described herein.

FIG. 4 shows the primitive processing stages for implementing the rasteriser 33 of the graphics processing pipeline of the present embodiment in more detail. In the present embodiment, the graphics processing pipeline is configured to perform Patch Forward Pixel Kill (PFPK), e.g. as described in US 2020/0074721. Thus, as shown in FIG. 4, the rasterisation stage 118 is operable to receive an input primitive 102, and if that primitive passes the coverage and hierarchical ZS testing discussed above, include the input primitive 102 in a fragment tracking record or "PFPK (Patch Forward Pixel Kill) tracker" 202, as illustrated by arrow 204.

The graphics processing system maintains metadata for each primitive included in the fragment tracking record 202 that will be rasterised to fragments. The metadata in the fragment tracking record 202 is used in order to determine whether a primitive has fragments that can be discarded or "killed" (e.g. removed from any further processing). This can facilitate a reduction in processing effort, e.g. in respect of primitives that will eventually be overdrawn by newly received primitives that enter the rendering pipeline.

Figure 5:
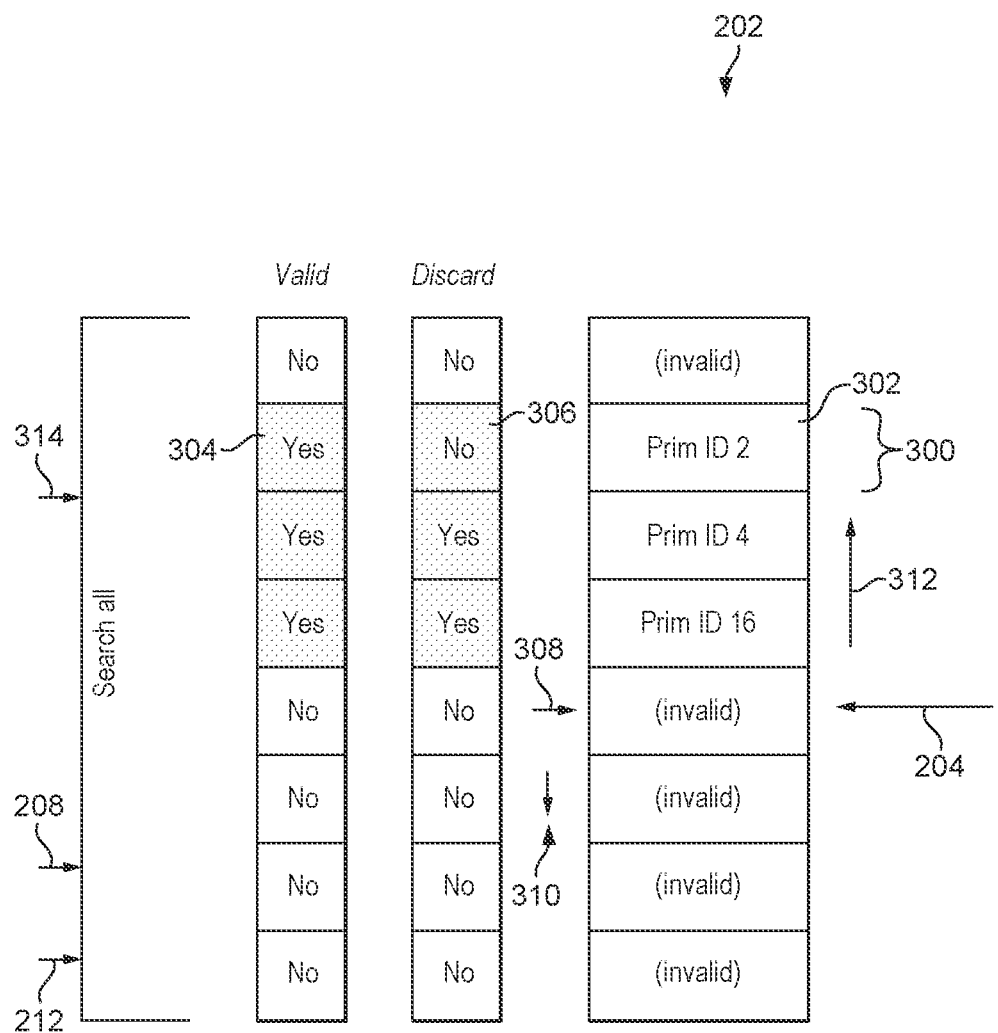
FIG. 5 shows schematically and in more detail a fragment tracking record that can be operated in accordance with the technology described herein.

FIG. 5 schematically shows the fragment tracking record 202 according to this embodiment. As shown in FIG. 5, the fragment tracking record 202 comprises plural sets of metadata, such as set of metadata 300, with each set of metadata being assigned to a primitive currently being processed. In the present embodiment, each set of metadata in the fragment tracking record 202 comprises: a valid flag, such as valid flag 304, that indicates whether or not that set of metadata is assigned to a primitive that is currently being processed; a discard flag, such as discard flag 306, that indicates whether or not the primitive in question has fragments that can be discarded or "killed", e.g. not processed, and a data field, such data field 302, for storing a primitive identifier associated with the primitive in question, and information indicating which buffer(s) the primitive writes to.

In the present embodiment, a discard flag 306 can either indicate that all of the fragments generated from the respective primitive cannot be "killed" (discarded) at all, or can be "killed" (discarded) entirely (e.g. removed from any further processing).

However, in other embodiments, more sophisticated arrangements can be used, such as those described in US 2020/0074721. For example, the metadata may indicate specifically which specific fragment processing operations (e.g. such as ZS testing, ZS results writing, fragment rendering and fragment data writing) can be omitted.

In the present embodiment, when a new primitive 102 is received by the rasteriser 33 and passes the coverage and initial ZS testing, and thus is to be added to the fragment tracking record 202 by the rasteriser 33, a primitive identifier associated with that primitive, together with information indicating one or more buffers that the primitive writes to, is included in an entry in the fragment tracking record 202 that is pointed to by a pointer 308 that indicates the next available entry (as indicated by arrow 204). The corresponding valid flag 304 is also set to indicate that the entry corresponds to a valid primitive. The corresponding discard flag 306 is also initially set to indicate that the primitive has fragments that cannot (at least for the time being) be discarded or "killed". The pointer 308 is then moved to the next available entry in the fragment tracking record 202 as indicated by arrow 310.

If, during the hierarchical rasterisation processed discussed above, the newly added primitive was determined as only partially covering the largest patch (corresponding to the rendering tile being processed), then nothing more needs to be done for the time being. However, if (as is the case in the embodiment shown in FIG. 4) the newly added primitive 102 was determined as fully covering the largest patch (i.e. corresponding to rendering tile 200) and passes the initial ZS testing, then the inclusion of the input primitive 102 in the fragment tracking record 202 (as illustrated by arrow 204) triggers a search though the metadata entries in the fragment tracking record 202, to identify any previously added primitives that can now be discarded or "killed" because they write data to one or more buffers that will inevitably be overwritten by the newly added primitive 102.

In the present embodiment, as indicated by arrow 312, this "kill search" involves a sequential search backwards (i.e. in an opposite order to the order in which the primitives were received and included in the fragment tracking record 202) through the metadata entries in the fragment tracking record 202. When the sequential search encounters a particular previously added primitive for which data will inevitably be overwritten by the newly added primitive, the discard flag 306 for that particular previously added primitive is set to indicate that the primitive has fragments that can be discarded or "killed". The sequential search may terminate when a previously added primitive for which data cannot be overwritten is found, so as to avoid inadvertently discarding or "killing" fragments for earlier received primitives whose processing may impact on the processing of fragments for later received primitives.

As shown in FIG. 4, the fragments generated by the rasterisation stage 118 are passed to an output buffer 206. At this stage, a fragment discard check or "kill check" signal 208 is sent between the output buffer 206 and the fragment tracking record 202 to determine if any fragments in the output buffer 206 for a particular primitive can be discarded or "killed" at this early stage, for example because data for those fragments will be overwritten by a subsequently received primitive that has since been input to the rasteriser 33.

When a kill check is made by the output buffer 206 in respect of fragments of a particular primitive, a search is conducted through the metadata entries in the fragment tracking record 202 for the primitive identifier corresponding to that particular primitive. When that particular primitive is found, the status of the discard flag is checked to see whether the fragments of the particular primitive can be discarded or "killed".

If the metadata (discard flag 306) indicates that the fragments of the particular primitive can be discarded, then the fragments of the particular primitive are removed from the output buffer 206 and are not output from the output buffer 206 for further processing. However, if the metadata (discard flag 306) indicates that the fragments of the particular primitive cannot be discarded, then the fragments of the particular primitive can be output from the output buffer 206 for further processing by the graphics processing system.

The generated fragments 210 that survive the kill check are then passed to the rendering unit 34, as shown in FIG. 3.

In the present embodiment, the rendering unit 34 includes an early depth and stencil (ZS) test stage 106, a rendering stage in the form of a fragment shading pipeline stage 108, and a late depth and stencil (ZS) test stage 110. Fragments issued (output) by the rasteriser 33 are subject to an early depth and stencil test in the early ZS testing stage 106. This early ZS testing stage 106 performs depth and stencil tests on the individual (covered) sampling positions associated with the fragments issued by the rasteriser 33 (i.e. at per sampling point resolution).

To do this, the early ZS testing stage 106 uses per-sampling position depth and stencil values stored in the ZS buffers 114. Thus, the ZS buffers 114 store an appropriate depth (Z) value and stencil (S) value, respectively, for each sampling point that the buffer represents (essentially for each sampling point position of the tile that is being processed). These values are stored in the ZS buffers 114 when sampling points being tested by early ZS testing stage 106 and the late ZS testing stage 110 pass the respective depth and stencil tests (the stencil values can be stored/updated when the tests are failed as well).

The early ZS testing stage 106 is configured to operate in an appropriately conservative manner. Fragments that fail the early ZS testing stage 106 are culled by the early ZS testing stage 106. Fragments that pass the early ZS testing stage 106 (i.e. fragments having at least one associated covered sampling position that passes the early ZS testing stage 106) are sent onwards to the fragment shading stage 108.

As with the output buffer 206, prior to performing (e.g. one or more or each of) one or more fragment processing (depth and/or stencil testing) operations on the fragments it receives, the early ZS testing stage 106 can send an additional fragment discard or "kill check" signal 212 to the fragment tracking record 202 to determine if any fragments for the primitive in question can be discarded or "killed" at this stage, for example because data for those fragments will be overwritten by a subsequent primitive that has since been input to the rasteriser 33.

If the metadata (discard flag 306) for the primitive in question indicates that the fragments of that primitive can be killed, then those fragments will not be ZS tested by the early ZS testing stage 106 or sent onwards to the fragment shading stage 108.

If the metadata (discard flag 306) for the primitive in question indicates that the fragments of that primitive cannot be killed, then those fragments will be ZS tested by the early ZS testing stage 106, and fragments passing the early ZS testing stage 106 will be sent onwards to the fragment shading stage 108.

The fragment shading stage 108 then performs the appropriate fragment processing (rendering) operations on the fragments it receives, so as to process the fragments to generate the appropriate fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data. In the present embodiment, the fragment shading stage 108 is in the form of a shader pipeline (a programmable fragment shader), but other arrangements, such as the use also or instead of fixed function fragment shading units would be possible, if desired.

Again, prior to performing (e.g. one or more or each of) one or more fragment processing (rendering) operations on the fragments it receives, the fragment shading stage 108 can send an additional fragment discard or "kill check" signal 212 to the fragment tracking record 202 to determine if any fragments for the primitive in question can be discarded or "killed" at this stage, for example because data for those fragments will be overwritten by a subsequent primitive that has since been input to the rasteriser 33.

If the metadata (discard flag 306) for the primitive in question indicates that the fragments of that primitive can be killed, then those fragments will not be processed by the fragment shading stage 108 or sent onwards to the late fragment depth and stencil (ZS) test stage 110.

If the metadata (discard flag 306) for the primitive in question indicates that the fragments of that primitive cannot be killed, then those fragments will processed by the fragment shading stage 108, and fragments will be passed to the late fragment depth and stencil (ZS) test stage 110.

The late fragment depth and stencil (ZS) test stage 110 then (if it is to be performed, e.g. where early depth and stencil testing for a fragment has not taken place before shading) carries out, inter alia, the end of pipeline depth test on the shaded fragments (on the covered sampling points associated with shaded fragments) to determine whether the sampling points that a rendered fragment represents will overdraw the fragments whose values are currently stored in the ZS buffers 114 (i.e. determines whether the fragment data for the fragments issuing from the fragment shading stage 108 should be stored in the tile buffers 35 (should replace or modify the fragment data in the tile buffer(s) 35 of the fragments that have already been rendered)).

To do this, the late ZS test stage 110 compares the depth values of (associated with) the fragments issued from the fragment shading stage 108 with the (per-sampling position) depth values stored in the ZS buffers 114 for the sampling points in question. The depth values for sampling points that pass the late depth test are also written appropriately to the ZS buffer 114 to update it.

This late ZS test stage 110 also carries out any necessary "late" alpha and/or stencil tests on the fragments. Alternatively, any necessary "late" alpha and/or stencil tests may be performed by the fragment shading stage 108.

Fragments that fail the late ZS test stage 110 are culled by the late ZS test stage 110. The fragments that pass the late fragment ZS test are then subjected to any remaining operations necessary on the fragments, such as blending with the framebuffer, dither etc. (not shown).

Again, prior to performing (e.g. one or more or each of) one or more fragment processing (depth and/or stencil testing) operations on the fragments it receives, the late ZS testing stage 110 can send an additional fragment discard or "kill check" signal 212 to the fragment tracking record 202 to determine if any fragments for the primitive in question can be discarded or "killed" at this stage, for example because data for those fragments will be overwritten by a subsequent primitive that has since been input to the rasteriser 33.

If the metadata (discard flag 306) for the primitive in question indicates that the fragments of that primitive can be killed, then those fragments will not be ZS tested by the late ZS testing stage 110 or have their rendered fragment data output to the tile buffer 35.

If the metadata (discard flag 306) for the primitive in question indicates that the fragments of that primitive cannot be killed, then those fragments will be ZS tested by the late ZS testing stage 110, and fragments passing the later ZS testing stage 110 will have their rendered fragment data output to the tile buffer 35.

When a particular primitive is invalidated, for example because processing of the primitive or all of its fragments is terminated (e.g. the primitive or all of its fragments have been discarded or "killed") or because processing of the primitive or all of its fragments is completed, a search (as indicated by arrow 314 in FIG. 5) is conducted through the metadata entries in the fragment tracking record 202 for the primitive identifier corresponding to that particular primitive. When that particular primitive is found, the status of the valid flag 304 corresponding to that primitive is set to invalid. This makes the entry assigned to the particular primitive available for use by another primitive.

The above describes the basic process of the graphics processing pipeline shown in FIGS. 2 to 4. The operation of the graphics processing pipeline in accordance with an embodiment of the technology described herein will now be described.

As discussed above, when a primitive 102 that fully covers the rendering tile 200 that is being generated is added to the fragment tracking record 202, a backwards "kill search" 312 though the metadata entries in the fragment tracking record 202 is triggered, to identify any previously added primitives that can now be discarded or "killed" because they write data to one or more buffers that will inevitably be overwritten by the newly added primitive. In the present embodiment, in addition to such a "kill search" 312 being triggered by a newly received primitive 102 to be rendered, a "kill search" 312 is triggered by reaching the end of a rendering tile 200 (and so, after all of the "new primitive triggered" "kill searches" in respect of that tile 200 have been performed). In particular, in the present embodiment, a "kill search" 312 is triggered in response to the primitive selection unit 29 identifying that there are no primitives in the primitive lists 26 left to be selected for the rendering tile 200 currently being generated.

As discussed above, since primitives are processed by the graphics processing pipeline in a pipelined manner, when the end of a rendering tile is identified (i.e. when there are no primitives in the primitive lists 26 left to be selected for the rendering tile), there will typically still be primitives for the rendering tile that have yet to complete their processing through the pipeline. The Applicants have found that it may sometimes be the case that at least some of this processing that remains to be performed when the end of a rendering tile is reached is redundant. They have accordingly found that the triggering a "kill search" 312 at this point in the rendering process can achieve significant savings in terms of the processing effort required to generate a rendering tile, and thus overall render output, e.g. frame for display.

Figure 6:
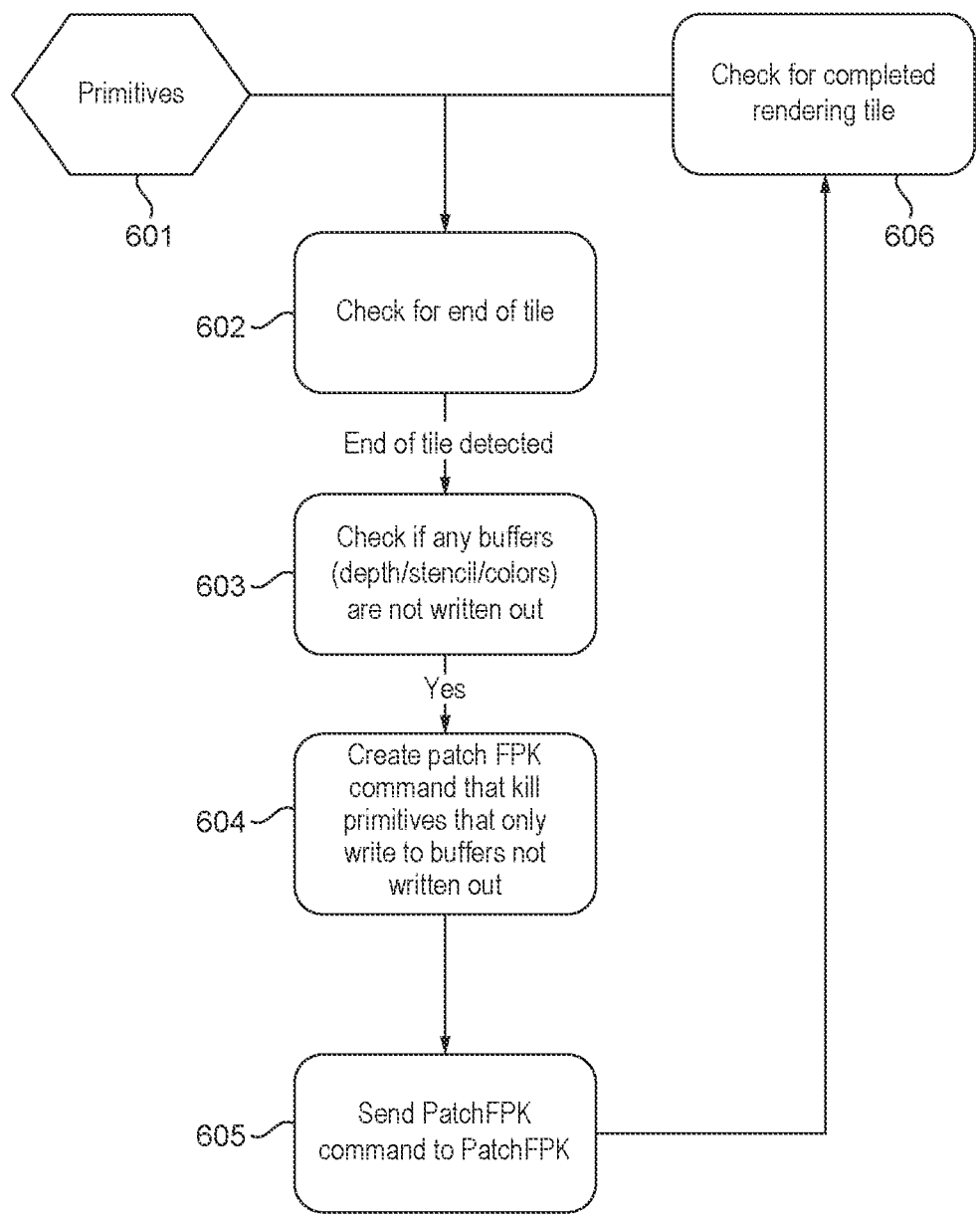
FIG. 6 shows schematically a process in accordance with an embodiment of the technology described herein.

FIG. 6 schematically illustrates the process of performing such a "kill search", according to the present embodiment. As shown in FIG. 6, at step 601, primitives for a rendering tile are provided by the primitive and vertex selection units 29, 31 to subsequent stages of the graphics processing pipeline 3 for processing.

Then, at step 602, when there are no primitives in the primitive lists 26 left to be selected for the rendering tile, it is determined that the end of the current rendering tile has been reached. At this point, as already mentioned above, there should be at least some primitives in the pipeline with processing left to be performed for the rendering tile.

This then triggers, at step 603, a check to determine which buffers (e.g. which buffers of tile buffers 35, and ZS buffers 112, 114) are to be written out to the main memory 23 once processing for the rendering tile has been completed (i.e. once all primitives for the rendering tile that are to pass all the way through the pipeline have passed all the way through the pipeline), and which buffers (e.g. which buffers of tile buffers 35, and ZS buffers 112, 114) are not to be written out to the main memory 23.

It will be appreciated here that it may typically be the case that only a colour buffer stored in the tile buffer 35 will be output to a frame buffer in the main memory 23 once a rendering tile has been completed, and other buffers, e.g. depth (Z) and stencil (S) buffers, will not be output to the main memory 23. However, it can be the case that multiple e.g. colour, buffers and/or other buffer(s) are output to the memory 23. For example, in the case of a depth (Z) only rendering pass, e.g. of a deferred rendering scheme, a depth (Z) buffer may be output to the main memory 23 for use in a subsequent rendering pass. Other outputs of the pipeline would be possible.

At step 604, based on the determination of which buffers are and are not to be written out to the main memory 23 (of step 603), a command is created that will trigger a "kill search" through metadata entries in the fragment tracking record 202 to identify any primitives that can be discarded or "killed" because they will not affect any buffer(s) that will be written out to the main memory 23.

Then, at step 605, the command triggers the "kill search". This will have the effect that when the so-triggered sequential backwards "kill search" encounters a primitive for which data will not be written out to the main memory 23, the discard flag 306 for that primitive will be set to indicate that the primitive has fragments that can be discarded or "killed". The fragments for the primitive may then be "killed" (discarded from further processing) in response to a subsequent "kill check" 512, in the manner as discussed above.

As shown in FIG. 6, at step 606, once processing for the current rendering tile has been completed (and the output buffer(s) for the rendering tile written out to memory 23), the process may be repeated for the next rendering tile making up the current render output, e.g. frame for display, and so on. Once the current render output has been completed, the process may be repeated for the next render output, and so on.

Figure 7:
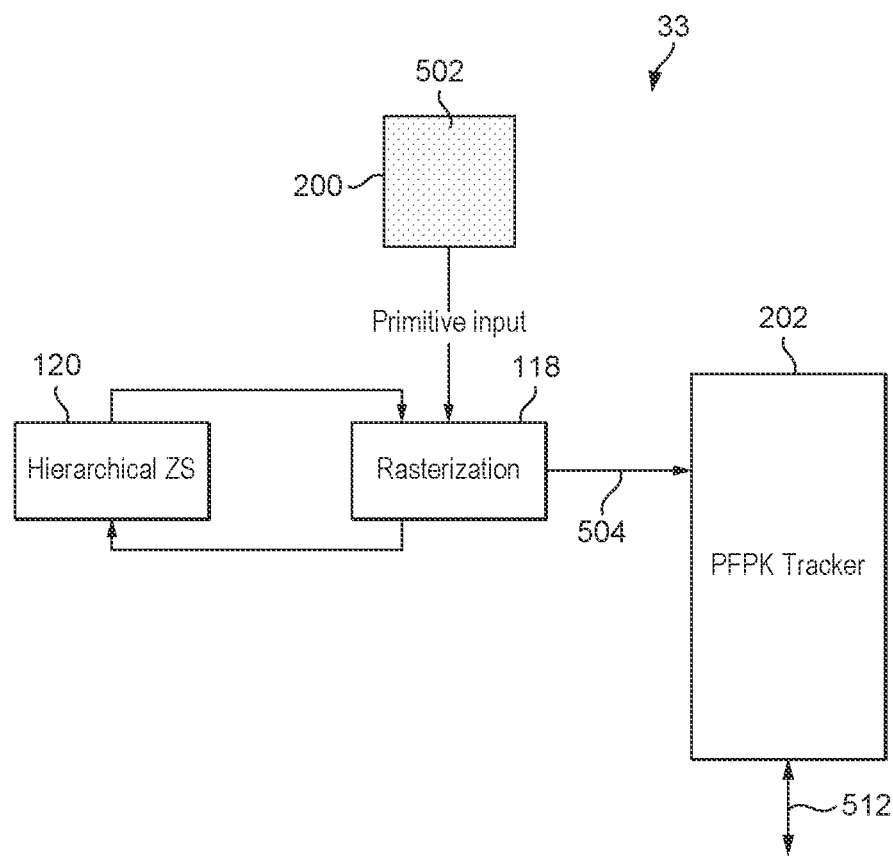
FIG. 7 shows schematically a process in accordance with an embodiment of the technology described herein.

FIG. 7 schematically illustrates the "kill search" command generation 604 and triggering 605 steps according to the present embodiment. In the present embodiment, as illustrated in FIG. 7, a "kill search" command generated in response to reaching the end of a rendering tile 200 (at step 604) is effectively a "dummy" or "clean-up" primitive 502 that is provided to the rasterisation stage 118 of the rasteriser 33, after all of the "regular" primitives (that were listed in the primitive list(s) 26 for the rendering tile) have been provided to the rasterisation stage 118 for processing.

As shown in FIG. 7, the dummy primitive 502 is, in effect, a primitive that fully covers the rendering tile 200 that is being generated, and that will overwrite all of the buffer(s) that have been determined (at step 603) as being buffer(s) that are not going to be written out to the memory 23 (but will not write to any buffer(s) that are to be written out to the memory 23).

When the dummy primitive 502 is received by the rasteriser 33, it will accordingly pass the initial ZS testing and will be determined as fully covering the largest patch (i.e. rendering tile 200). The dummy primitive 502 will thus, in the manner described above, trigger a "kill search" 504 through the metadata entries in the fragment tracking record 202, which will identify any primitives that can be discarded or "killed" because they write data (only) to a buffer or buffers that will apparently be overwritten by the dummy primitive 502. This "kill search" will accordingly have the effect of identifying zero or more primitives that can be discarded or "killed" because they do not affect (write to) a buffer that will be output to the memory 23 when the rendering tile 200 is completed.

As discussed above, this "kill search" involves a sequential search backwards (i.e. in an opposite order to the order in which the primitives were received and included in the fragment tracking record 202) through the metadata entries in the fragment tracking record 202. When the sequential search encounters a primitive for which data will apparently be overwritten by the dummy primitive 502, the discard flag 306 for that particular primitive is set to indicate that the primitive has fragments that can be discarded or "killed". The sequential search may terminate when a primitive for which data will not apparently be overwritten is found, so as to avoid inadvertently discarding or "killing" fragments for earlier received primitives whose processing may impact on the processing of fragments for later received primitives.

Subsequently, when a kill check 512 is made by a later stage of the pipeline (such as output buffer 206, early depth and stencil (ZS) test stage 106, fragment shading stage 108, or late depth and stencil (ZS) test stage 110) in respect of fragments of a particular primitive that remains to be processed for the rendering tile 200, a search will be conducted through the metadata entries in the fragment tracking record 202 for the primitive identifier corresponding to that particular primitive. When that particular primitive is found, the status of the discard flag 306 will be checked to see whether the fragments of the particular primitive can be discarded or "killed". If the metadata (discard flag 306) now indicates that the fragments of the particular primitive can be discarded (as a result of the effect of the dummy primitive 502), then the fragments of the particular primitive are discarded, in a manner as discussed above.

In this way, fragment processing that remains to be performed when the end of the rendering tile 200 is reached may be omitted, such that overall processing effort required to generate the rendering tile 200 may be saved.

Although the above has been described with reference to a graphics processing pipeline that performs Patch Forward Pixel Kill (PFPK), e.g. as described in US 2020/0074721, in other embodiments the graphics processor may be configured according to other Forward Pixel Kill (FPK) arrangements. For example, rather than triggering an update to metadata 202, reaching the end of a rendering tile may trigger a signal to fragment processing stages to "kill" the appropriate fragments, with the signal being e.g. as described in US 2014/0168220 and/or US 2014/0354654.

It can be seen from the above that embodiments of the technology described herein can reduce the amount of fragment processing performed by a graphics processing pipeline to generate a rendering tile, and thus overall render output, e.g. frame for display. This is achieved, in embodiments of the technology described herein by, when there are (in response to there being) no primitives left to be provided for processing to the graphics processing pipeline for a rendering tile, identifying one or more primitives left in the pipeline for the rendering tile that will not affect an output buffer, and discarding (i.e. "killing") (fragments for) those primitives from further processing.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a tile-based graphics processor that is operable to execute a graphics processing pipeline, the graphics processing pipeline including at least a primitive providing stage and one or more subsequent processing stages, wherein the primitive providing stage is operable to provide primitives to be processed for a rendering tile to the one or more subsequent processing stages for processing, and the one or more subsequent processing stages are operable to perform processing steps in respect of primitives provided for processing by the primitive providing stage; the method comprising:

the primitive providing stage providing a set of primitives to be processed for a rendering tile to the one or more subsequent processing stages of the graphics processing pipeline for processing; and when there are no more primitives of set of primitives left for the primitive providing stage to provide for processing to the one or more subsequent processing stages of the graphics processing pipeline for the rendering tile, determining whether one or more processing steps to be performed by the one or more subsequent processing stages of the graphics processing pipeline in respect of at least one primitive of the set of primitives previously provided for processing by the primitive providing stage for the rendering tile need not be performed; and when it is determined that one or more processing steps to be performed by the one or more subsequent processing stagesof the graphics processing pipeline in respect of at least one primitive of the set of primitives previously provided for processing by the primitive providing stage for the rendering tile need not be performed, causing the one or more subsequent processing stages of the graphics processing pipeline to omit performing the one or more processing steps in respect of the at least one primitive.

2. The method of claim 1, wherein the tile-based graphics processor comprises a tile buffer; the method comprising:

determining whether the one or more processing steps to be performed in respect of the at least one primitive will not affect a buffer of the tile buffer that is to be written out upon completing the rendering tile; and determining that the one or more processing steps to be performed in respect of the at least one primitive need not be performed when it is determined that the one or more processing steps to be performed in respect of the at least one primitive will not affect a buffer of the tile buffer that is to be written out upon completing the rendering tile.

3. The method of claim 2, wherein the buffer of the tile buffer that is to be written out is a colour buffer, a depth buffer or a stencil buffer.

4. The method of claim 2, wherein the one or more subsequent processing stages pipeline comprise one or more earlier processing stages and one or more later processing stages; wherein the one or more earlier processing stages are operable to determine whether one or more processing steps to be performed by the one or more later processing stages in respect of a primitive need not be performed, and to, when it is determined that one or more processing steps to be performed by the one or more later processing stages in respect of a primitive need not be performed, cause the one or more later processing stages to omit performing the one or more processing steps in respect of the primitive; the method comprising:

when there are no more primitives of the set of primitives left for the primitive providing stage to provide for processing to the one or more subsequent processing stages of the graphics processing pipeline for the rendering tile, causing the one or more earlier processing stages to determine that one or more processing steps to be performed by the one or more later processing stages in respect of the at least one primitive need not be performed, and to therefore cause the one or more later processing stages to omit performing the one or more processing steps in respect of the at least one primitive.

5. The method of claim 4, wherein the one or more earlier processing stages are operable to determine whether a primitive will be overdrawn such that one or more processing steps to be performed by the one or more later processing stages in respect of the primitive need not be performed, and to, when it is determined that a primitive will be overdrawn such that one or more processing steps to be performed by the one or more later processing stages in respect of the primitive need not be performed, cause the one or more later processing stages to omit performing the one or more processing steps in respect of the primitive; and wherein causing the one or more earlier processing stages to determine that one or more processing steps to be performed by the one or more later processing stages in respect of the at least one primitive need not be performed comprises providing to the one or more earlier processing stages, a command that will trigger the one or more earlier processing stages to determine that the at least one primitive will be overdrawn.

6. The method of claim 4, wherein the one or more earlier processing stages are operable to cause the one or more later processing stages to omit performing one or more processing steps in respect of a primitive by sending a signal to the one or more later processing stages that indicates that the one or more processing steps in respect of the primitive need not be performed; and the one or more later processing stages are operable to omit performing one or more processing steps in respect of a primitive in response to receiving a signal from the one or more earlier processing stages that indicates that the one or more processing steps in respect of the primitive need not be performed; the method comprising:

the one or more earlier processing stages causing the one or more later processing stages to omit performing the one or more processing steps in respect of the at least one primitive by sending a signal to the one or more later processing stages that indicates that the one or more processing steps in respect of the at least one primitive need not be performed.

7. The method of claim 4, wherein the one or more later processing stages are operable to, prior to performing one or more processing steps in respect of a primitive, determine whether metadata stored for the primitive indicates that the one or more processing steps in respect of the primitive need not be performed, and to, when it is determined that metadata stored for the primitive indicates that one or more processing steps in respect of the primitive need not be performed, omit performing nthe one or more processing steps in respect of the primitive; and the one or more earlier processing stages are operable to cause the one or more later processing stages to omit performing one or more processing steps in respect of a primitive by storing metadata for the primitive that indicates that the one or more processing steps in respect of the primitive need not be performed; the method comprising:

the one or more earlier processing stages causing the one or more later processing stages to omit performing the one or more processing steps in respect of the at least one primitive by storing metadata for the at least one primitive that indicates that the one or more processing steps in respect of the at least one primitive need not be performed.

8. The method of claim 7, wherein determining whether the one or more processing steps to be performed in respect of the at least one primitive need not be performed comprises determining whether metadata stored for the at least one primitive does not indicate that the at least one primitive writes data to a buffer of the tile buffer that is to be written out.

9. The method of claim 1, wherein the one or more processing steps to be performed in respect of the at least one primitive are all of the processing steps remaining to be performed in respect of the at least one primitive for the rendering tile, such that when the one or more processing steps in respect of the at least one primitive are omitted, the at least one primitive is discarded from further processing for the rendering tile.

10. A tile-based graphics processor that is operable to execute a graphics processing pipeline, the graphics processing pipeline including one or more processing stages that are operable to perform processing steps in respect of primitives provided for processing; the tile-based graphics processor comprising:

a primitive providing circuit configured to provide a set of primitives to be processed for a rendering tile to the one or more processing stages of the graphics processing pipeline for processing; and a determining circuit configured to, when there are no more primitives of a set of primitives left for the primitive providing circuit to provide for processing to the one or more processing stages of the graphics processing pipeline for a rendering tile, determine whether one or more processing steps to be performed by the one or more processing stages of the graphics processing pipeline in respect of at least one primitive of the set of primitives previously provided for processing by the primitive providing circuit for the rendering tile need not be performed; and to:

when it is determined that one or more processing steps to be performed by the one or more processing stages of the graphics processing pipeline in respect of at least one primitive of the set of primitives previously provided for processing by the primitive providing circuit for the rendering tile need not be performed, cause the one or more processing stages of the graphics processing pipeline to omit performing the one or more processing steps in respect of the at least one primitive.

11. The tile-based graphics processor of claim 10, comprising a tile buffer; wherein the determining circuit is configured to determine whether the one or more processing steps to be performed in respect of the at least one primitive will not affect a buffer of the tile buffer that is to be written out upon completing the rendering tile; and to determine that the one or more processing steps to be performed in respect of the at least one primitive need not be performed when it is determined that the one or more processing steps to be performed in respect of the at least one primitive will not affect a buffer of the tile buffer that is to be written out upon completing the rendering tile.

12. The tile-based graphics processor of claim 11, wherein the buffer of the tile buffer that is to be written out is a colour buffer, a depth buffer or a stencil buffer.

13. The tile-based graphics processor of claim 11, wherein the one or more processing stages of the graphics processing pipeline comprise one or more earlier processing stages and one or more later processing stages; wherein the one or more earlier processing stages include the determining circuit and are operable to determine whether one or more processing steps to be performed by the one or more later processing stages in respect of a primitive need not be performed, and to, when it is determined that one or more processing steps to be performed by the one or more later processing stages in respect of a primitive need not be performed, cause the one or more later processing stages to omit performing the one or more processing steps in respect of the primitive; and wherein the tile-based graphics processor comprises a processing circuit configured to, when there are no more primitives of the set of primitives left for the primitive providing circuit to provide for processing to the one or more processing stages of the graphics processing pipeline for the rendering tile, cause the one or more earlier processing stages to determine that one or more processing steps to be performed by the one or more later processing stages in respect of at least one primitive need not be performed, and to therefore cause the one or more later processing stages to omit performing the one or more processing steps in respect of the at least one primitive.

14. The tile-based graphics processor of claim 13, wherein the one or more earlier processing stages are operable to determine whether a primitive will be overdrawn such that one or more processing steps to be performed by the one or more later processing stages in respect of the primitive need not be performed, and to, when it is determined that a primitive will be overdrawn such that one or more processing steps to be performed by the one or more later processing stages in respect of the primitive need not be performed, cause the one or more later processing stages to omit performing the one or more processing steps in respect of the primitive; and
 wherein the processing circuit is configured to cause the one or more earlier processing stages to determine that one or more processing steps to be performed by the one or more later processing stages in respect of at least one primitive need not be performed by providing to the one or more earlier processing stages, a command that will trigger the one or more earlier processing stages to determine that the at least one primitive will be overdrawn.

15. The tile-based graphics processor of claim 13, wherein the one or more earlier processing stages are operable to cause the one or more later processing stages to omit performing one or more processing steps in respect of a primitive by sending a signal to the one or more later processing stages that indicates that the one or more processing steps in respect of the primitive need not be performed; and the one or more later processing stages are operable to omit performing one or more processing steps in respect of a primitive in response to receiving a signal from the one or more earlier processing stages that indicates that the one or more processing steps in respect of the primitive need not be performed; and
 wherein the one or more earlier processing stages are configured to cause the one or more later processing stages to omit performing the one or more processing steps in respect of the at least one primitive by sending a signal to the one or more later processing stages that indicates that the one or more processing steps in respect of the at least one primitive need not be performed.

16. The tile-based graphics processor of claim 13, wherein the one or more later processing stages are operable to, prior to performing one or more processing steps in respect of a primitive, determine whether metadata stored for the primitive indicates that the one or more processing steps in respect of the primitive need not be performed, and to, when it is determined that metadata stored for the primitive indicates that one or more processing steps in respect of the primitive need not be performed, omit performing the one or more processing steps in respect of the primitive; and the one or more earlier processing stages are operable to cause the one or more later processing stages to omit performing one or more processing steps in respect of a primitive by storing metadata for the primitive that indicates that the one or more processing steps in respect of the primitive need not be performed; and
 wherein the one or more earlier processing stages are configured to cause the one or more later processing stages to omit performing the one or more processing steps in respect of the at least one primitive by storing metadata for the at least one primitive that indicates that the one or more processing steps in respect of the at least one primitive not be performed.

17. The tile-based graphics processor of claim 16, wherein the determining circuit is configured to determine whether the one or more processing steps to be performed in respect of the at least one primitive need not be performed by determining whether metadata stored for the at least one primitive does not indicate that the at least one primitive writes data to a buffer of the tile buffer that is to be written out.

18. The tile-based graphics processor of claim 10, wherein the one or more processing steps to be performed in respect of at least one primitive are all of the processing steps remaining to be performed in respect of the at least one primitive for the rendering tile, such that when the one or more processing steps in respect of the at least one primitive are omitted, the at least one primitive is discarded from further processing for the rendering tile.

19. A non-transitory computer readable storage medium storing software code which when executing on a processor performs a method of operating a tile-based graphics processor that is operable to execute a graphics processing pipeline, the graphics processing pipeline including at least a primitive providing stage and one or more subsequent processing stages, wherein the primitive providing stage is operable to provide primitives to be processed for a rendering tile to the one or more subsequent processing stages for processing, and the one or more subsequent processing stages are operable to perform one or more processing steps in respect of primitives provided for processing by the primitive providing stage; the method comprising:
 the primitive providing stage providing a set of primitives to be processed for a rendering tile to the one or more subsequent processing stages of the graphics processing pipeline for processing; and
 when there are no more primitives of the set of primitives left for the primitive providing stage to provide for processing to the one or more subsequent processing stages of the graphics processing pipeline for the rendering tile, determining whether one or more processing steps to be performed by the one or more subsequent processing stages of the graphics processing pipeline in respect of at least one primitive of the set of primitives previously provided for processing by the primitive providing stage for the rendering tile need not be performed; and
 when it is determined that one or more processing steps to be performed by the one or more subsequent processing stages of the graphics processing pipeline in respect of at least one primitive of the set of primitives previously provided for processing by the primitive providing stage for the rendering tile need not be performed, causing the one or more subsequent processing stages of the graphics processing pipeline to omit performing the one or more processing steps in respect of the at least one primitive.

* * * * *